United States Patent
Nukui et al.

(10) Patent No.: US 11,635,864 B2
(45) Date of Patent: Apr. 25, 2023

(54) TOUCH SENSOR PATTERN

(71) Applicant: FUJIFILM Corporation, Tokyo (JP)

(72) Inventors: Katsuyuki Nukui, Kanagawa (JP); Tetsuro Mitsui, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/863,052

(22) Filed: Jul. 12, 2022

(65) Prior Publication Data
US 2023/0095219 A1  Mar. 30, 2023

(30) Foreign Application Priority Data

Aug. 30, 2021 (JP) .............................. JP2021-139846
Dec. 13, 2021 (JP) .............................. JP2021-201658
Mar. 11, 2022 (JP) .............................. JP2022-038014

(51) Int. Cl.
*G06F 3/044* (2006.01)
*H05K 1/16* (2006.01)
*H05K 1/02* (2006.01)
*G06F 3/041* (2006.01)

(52) U.S. Cl.
CPC ........ *G06F 3/0446* (2019.05); *G06F 3/04164* (2019.05); *G06F 2203/04112* (2013.01)

(58) Field of Classification Search
CPC ............... G06F 3/04164; G06F 3/0446; G06F 2203/04112
USPC ......................................................... 345/204
See application file for complete search history.

(56) References Cited

U.S. PATENT DOCUMENTS

2020/0142540 A1* 5/2020 Rahmani ................ H05K 3/361
2020/0326816 A1* 10/2020 Ogura .................... G06F 3/0446

FOREIGN PATENT DOCUMENTS

JP  2013-045246 A   3/2013
WO  2017/187266 A1  11/2017

* cited by examiner

*Primary Examiner* — Deeprose Subedi
(74) *Attorney, Agent, or Firm* — Edwards Neils LLC; Jean C. Edwards, Esq.

(57) ABSTRACT

A touch sensor pattern includes: a plurality of detection electrodes; a plurality of lead wires that are connected to the plurality of detection electrodes and a plurality of external connection terminals that are connected to the plurality of lead wires, in which each of the plurality of external connection terminals includes a first fine metal wire having a smaller line width than each of the plurality of lead wires, and an area per unit length of at least a part of each of the plurality of external connection terminals in an extension direction in a plan view is 5.5 times or less an area per unit length of each of the plurality of lead wires in a plan view.

5 Claims, 15 Drawing Sheets

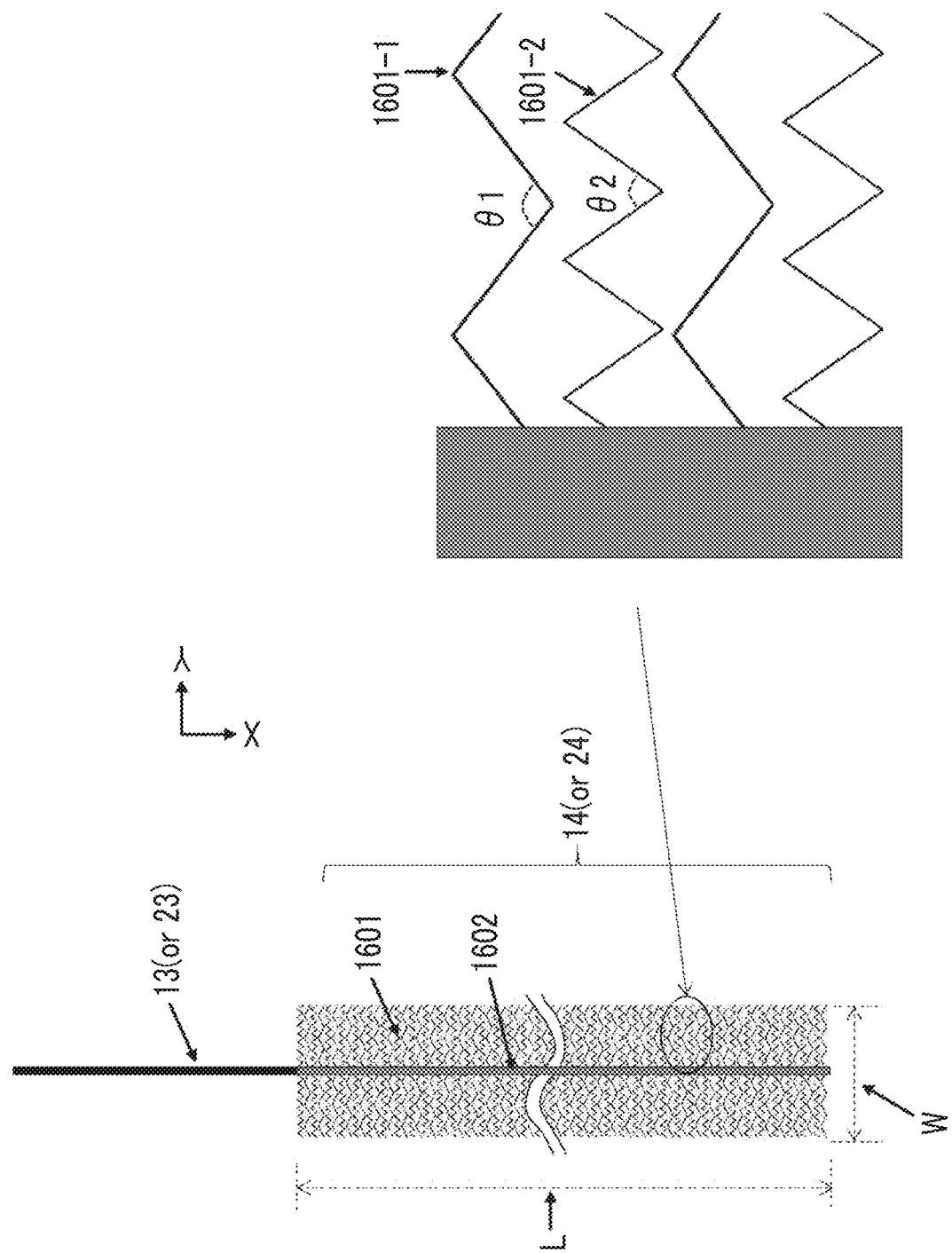

TOUCH SENSOR PATTERN

CROSS-REFERENCE TO RELATED APPLICATIONS

The present application claims priority under 35 U.S.C. § 119 to Japanese Patent Application No. 2021-139846 filed on Aug. 30, 2021, Japanese Patent Application No. 2021-201658 filed on Dec. 13, 2021, and Japanese Patent Application No. 2022-038014 filed on Mar. 11, 2022. The above applications are hereby expressly incorporated by reference, in their entirety, into the present application.

BACKGROUND OF THE INVENTION

1. Field of the Invention

The present invention relates to a touch sensor pattern of a touch sensor film.

2. Description of the Related Art

Recently, a metal mesh sensor formed of a fine metal wire is adopted as a touch sensor used in a touch panel. The metal mesh sensor has characteristics in that, for example, a touch electrode is formed of a fine metal wire, the resistance is lower than that of a conductive metal oxide such as indium tin oxide (ITO), and flexibility is achieved in a case where the metal mesh sensor is formed on a film surface.

The metal mesh sensor has a pattern structure that are mainly connected to a mesh electrode and a lead wire. The mesh electrode is disposed together with an image display unit of a touch panel, and the lead wire is disposed around the image display unit and has a structure extending up to a position (hereinafter referred to as "external connection terminal") where it is connected to a flexible printed circuit (FPC) connected to an integrated circuit (IC) chip for controlling a touch sensor. Typically, a plurality of lead wires corresponding to the number of mesh electrodes are present, are disposed at intervals of a given or more distance for insulation from adjacent lead wires, and extend up to the external connection terminal as a bundle corresponding to the number of the mesh electrodes. The external connection terminal is connected to the FPC through an anisotropic conductive film (ACF). The external connection terminal and the FPC need to be electrically connected to each other with reliability to drive the touch panel. For example, JP2013-045246A and WO2017/187266A discloses a method of devising the structure.

An exclusive area of the bundle of the lead wires is determined depending on a line width of the lead wires, the interval between adjacent lead wires, and the number of the lead wires, and the lead wires are generally hidden by a decorative printing portion. For the recent touch panel, design is required, and thus it is desired to reduce the area of the decorative printing portion and to widen the area of the image display unit in the touch panel (also referred to as "frame narrowing". That is, it is required to reduce the area of the decorative printing portion. To that end, for example, it is to reduce the area of the bundle of the lead wires. As a method corresponding to frame narrowing, for example, a reduction in the line width of the lead wires and a reduction in the interval between adjacent lead wires are performed (also referred to as "L/S down").

SUMMARY OF THE INVENTION

In general, for example, in a case where a support is wound using a roll-to-roll method, conductive patterns formed on the supports may overlap each other. In a case where the supports are peeled off in this state, the conductive pattern formed on the peeled support may be charged such that a potential difference is generated in the conductive pattern. Due to this potential difference, spark is generated in the conductive patterns, which may cause a failure in that, for example, the conductive pattern break.

On the other hand, as frame narrowing progresses, the distance between the external connection terminal and the mesh electrode for connecting the FPC decreases. Typically, the external connection terminal is a conductive pattern for connection to the FPC through the ACF, and is disposed at an end part of the lead wire. Typically, the external connection terminal is likely to have a size of several mm × several hundreds of μm in many cases such that electrical connection to conductive particles in the ACF.

The external connection terminal may be disposed to protrude to the outer side from the lead wire, and it was found that, due to the presence of a pattern other than the external connection terminal around the external connection terminal, in particular, in a narrow frame pattern in which the L/S is small, spark failure is likely to be generated from a bonding pad portion during roll-to-roll manufacturing. The reason for this is presumed to be that, since the surface pressure is high during the rolling of the external connection terminal (having a larger height than a portion where the pattern is not present) that is present independently of the appearance, peeling charging occurs strongly during unwinding of a roll film in the next step.

The techniques of JP2013-045246A and WO2017/187266A disclose the connection between the external connection terminal and the FPC but does not suggest anything regarding the suppression of the touch sensor film caused by the generation of spark.

The present invention has been made in order to solve the above-described problem, and an object thereof is to provide a touch sensor pattern of a touch sensor film that can suppress a failure caused by spark during manufacturing of a touch sensor film while suppressing connection reliability to a FPC.

A touch sensor pattern according to an aspect of the present invention is a touch sensor pattern of a touch sensor film, the touch sensor pattern comprising: a plurality of detection electrodes; a plurality of lead wires that are connected to the plurality of detection electrodes; and a plurality of external connection terminals that are connected to the plurality of lead wires, in which each of the plurality of external connection terminals includes a first fine metal wire having a smaller line width than each of the plurality of lead wires, and an area per unit length of at least a part of each of the plurality of external connection terminals in an extension direction in a plan view is 5.5 times or less an area per unit length of each of the plurality of lead wires in a plan view.

Some external connection terminals in the plurality of external connection terminals may further include a second fine metal wire having a line width of 5 μm or more.

The first fine metal wire may form a mesh-like pattern.

The first fine metal wire may form a linear pattern.

A pattern consisting of the second fine metal wire and a plurality of the first fine metal wires may include a pattern consisting of a non-closed figure.

According to the aspect of the present invention, the touch sensor film includes: a plurality of detection electrodes; a plurality of lead wires that are connected to the plurality of detection electrodes; a plurality of external connection terminals that are connected to the plurality of lead wires, in which the external connection terminal includes a first fine metal wire having a smaller line width than the lead wire, and an area per unit length of at least a part of the external connection terminal in an extension direction in a plan view is 5.5 times or less an area per unit length of the lead wire in a plan view. Therefore, a failure caused by spark during manufacturing of the touch sensor film can be suppressed while suppressing spark failure of the touch sensor film and reliably connecting an external connection terminal (bonding pad) and a FPC.

BRIEF DESCRIPTION OF THE DRAWINGS

FIG. 16 is an enlarged plan view showing an external connection terminal of a touch sensor film according to Example 27.

DESCRIPTION OF THE PREFERRED EMBODIMENTS

Hereinafter, a conductive member for a touch panel according to the present invention will be described in detail based on a preferable embodiment shown in the accompanying drawings.

In the following description, a numerical range indicated by the expression "to" includes numerical values described on both sides. For example, in a case where "s is a numerical value t1 to a numerical value t2", the range s is a range including the numerical value t1 and the numerical value t2, which is expressed by a mathematical symbol $t1 \leq s \leq t2$.

Unless specified otherwise, the meaning of an angle such as "perpendicular" or "parallel" includes a case where an error range is generally allowable in the technical field.

"Transparent" represents that a light transmittance in a visible wavelength range of 400 to 800 nm is at least 40% or more, preferably 75% or more, more preferably 80% or more, and still more preferably 90% or more. The light transmittance is measured using "Plastics—Determination of Total Luminous Transmittance And Reflectance" defined by JIS K 7375:2008.

Embodiment 1

Figure 1:
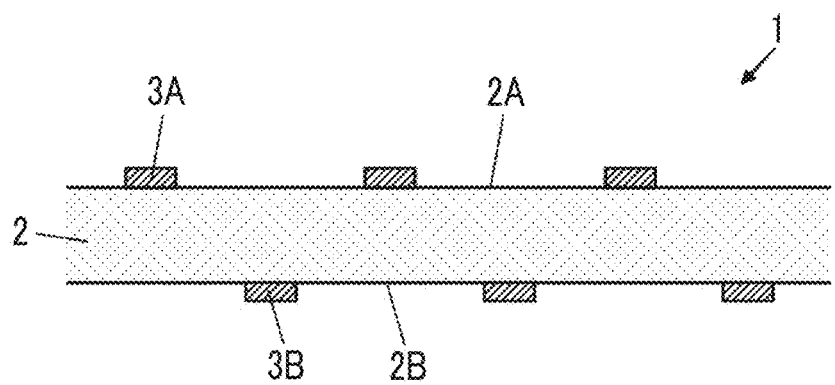
FIG. 1 is a partial cross-sectional view showing a film according to Embodiment 1 of the present invention.

FIG. 1 shows a configuration of a touch sensor film 1 according to Embodiment 1 of the present invention.

The touch sensor film 1 includes: a substrate 2 that is transparent and has insulating properties; a first conductive layer 3A that is disposed on a first surface 2A of the substrate 2; and a second conductive layer 3B that is disposed on a second surface 2B of the substrate 2.

Figure 2:
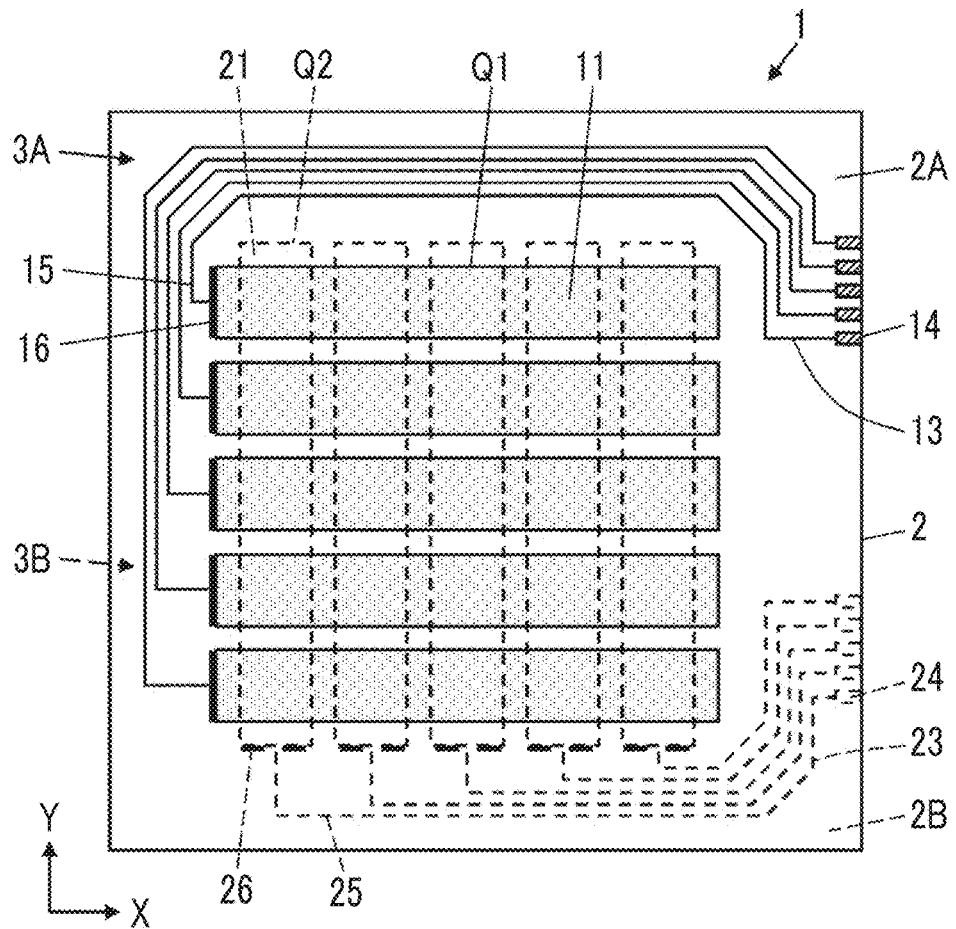
FIG. 2 is a plan view showing the film according to Embodiment 1 of the present invention.

As shown in FIG. 2, the substrate 2 includes a plurality of first electrode regions Q1 that extend in a given direction and are arranged in a direction perpendicular to the given direction on the first surface 2A.

The first conductive layer 3A that is disposed on the first surface 2A of the substrate 2 includes: a plurality of first detection electrodes 11 that are disposed on the plurality of first electrode regions Q1, respectively, and extend in the same direction as a direction in which the first electrode regions Q1 extend; a plurality of first lead wires 13 that are disposed around the plurality of first detection electrodes 11 and have a number corresponding to the number of the plurality of first detection electrodes 11; and a plurality of first external connection terminals 14 that are electrically connected to the plurality of first lead wires 13. The first detection electrode 11 is connected to one end of the first lead wire 13, and the first external connection terminal 14 is connected to another end of the first lead wire 13. Each of the plurality of first external connection terminals 14 has an elongated shape that extend in a given extension direction from one end connected to the first lead wire 13 to another end. The plurality of first detection electrodes 11, the plurality of first lead wires 13, and the plurality of first external connection terminals 14 have the same composition as each other. The plurality of first detection electrodes 11, the plurality of first lead wires 13, and the plurality of first external connection terminals 14 are formed at the same time.

Here, for convenience of description, a given direction in which the plurality of first detection electrodes 11 extend will be referred to as "X direction", an arrangement direction of the plurality of first detection electrodes 11 perpendicular to the X direction will be referred to as "Y direction", and a thickness direction of the plurality of first detection electrodes 11 perpendicular to the X direction and the Y direction will be referred to as "Z direction". In the example of FIG. 2, the extension direction of the plurality of first external connection terminals 14 is the X direction that is the same as the direction in which the plurality of first detection electrodes 11 extend.

One end part of each of the plurality of first lead wires 13 is disposed near an end part of the corresponding first detection electrode 11 on one side in the X direction, and another end part of each of the plurality of first lead wires 13 is connected to the first external connection terminal 14. One end part of the first lead wire 13 that is disposed near the first detection electrode 11 includes: a wiring part 15 that is disposed around the first detection electrode 11 and has one end part connected to the first external connection terminal 14; and a terminal part 16 that is connected to another end part of the wiring part 15 and extends in the Y direction.

Figure 3:
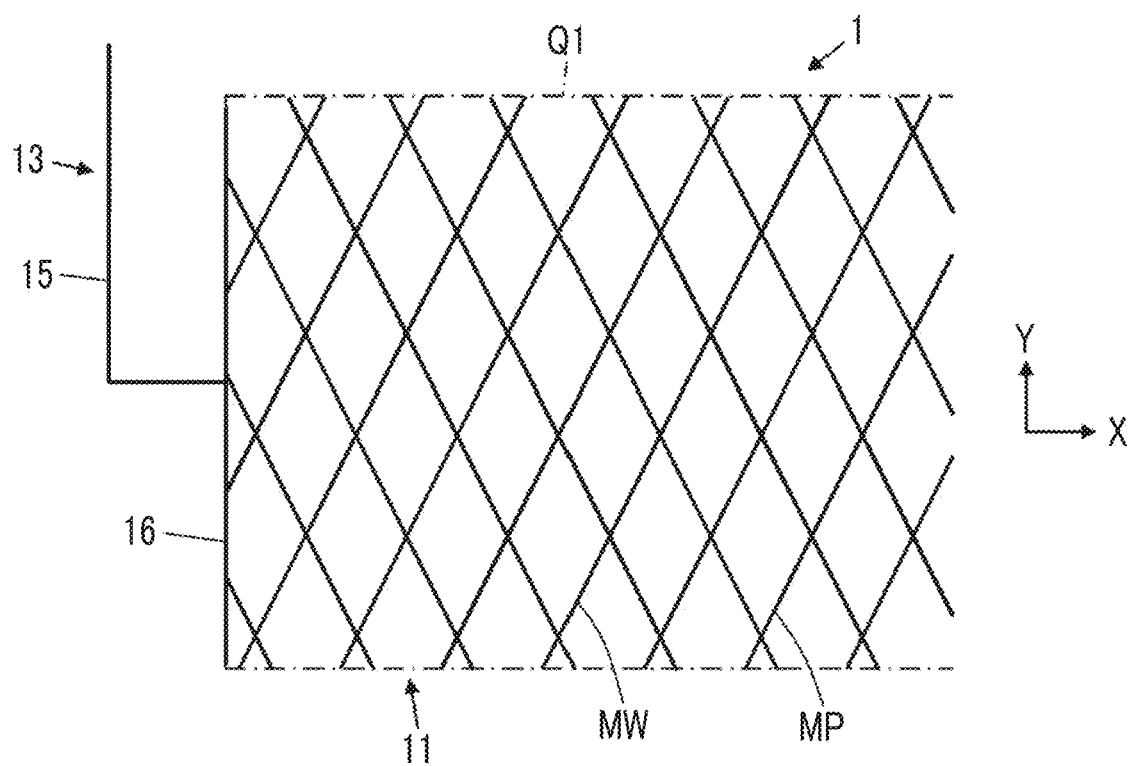
FIG. 3 is an enlarged plan view showing a first lead wire and a first detection electrode of the film according to Embodiment 1 of the present invention.

As shown in FIG. 3, the terminal part 16 and the first detection electrode 11 are connected to each other in the X direction.

In addition, the first detection electrode 11 is formed of a plurality of fine metal wires MW formed in the first electrode region Q1, and a rhombic mesh-like pattern MP is formed by the plurality of fine metal wires MW.

Incidentally, typically, the touch sensor film is designed in many cases such that the first detection electrode, the first lead wire, and the first external connection terminal are electrically connected to each other, for example, by connecting the first lead wire, the first detection electrode, and the first external connection terminal to each other. In addition, typically, in order to reduce the number of manufacturing steps, the first detection electrode, the first lead wire, and the first external connection terminal that are electrically connected to each other are formed at the same time in many cases.

The touch sensor film in the related art that is manufactured as described above may be laminated on another touch sensor film, for example, in a winding step of a so-called roll-to-roll method. In a case where the touch sensor films are peeled off in this state, a first conductive layer of the peeled touch sensor film may be charged such that a potential difference is generated in the first conductive layer. In a case where spark is generated in the first conductive layer due to this potential difference, there may be a failure in that a conductive pattern including a plurality of first detection electrodes, a plurality of first lead wires, and a plurality of first external connection terminals forming the first conductive layer.

In addition, recently, so-called frame narrowing is attempted by narrowing an outer side region of the plurality of detection electrodes. For this frame narrowing, the external connection terminal may be disposed to protrude to the outer side from the lead wire. In this case, due to the presence of a pattern other than the external connection terminal around the external connection terminal, there is a problem in that spark is likely to be generated from the same external connection terminal. The reason for the generation of spark is presumed to be that, since the external connection terminal has a larger height than a portion where the pattern is not present, the surface pressure is high during winding, and thus peeling charging occurs strongly during unwinding of a roll film in the next step.

Figure 4:
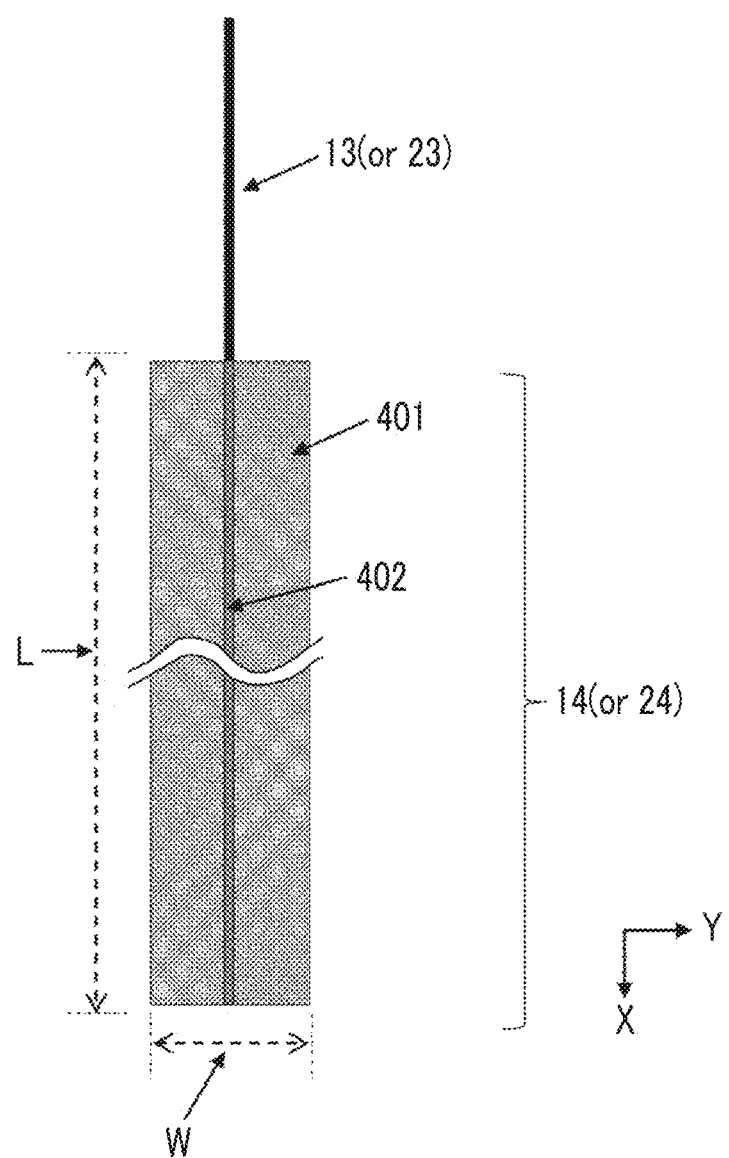
FIG. 4 is an enlarged plan view showing an external connection terminal of a touch sensor film according to Embodiment 1 of the present invention.

In the touch sensor film 1 according to Embodiment 1 of the present invention, the first external connection terminal 14 has a configuration of FIG. 4. The first external connection terminal 14 of FIG. 4 has a rectangular external shape having a length L in the X direction as the extension direction and a width W in the Y direction. In addition, on an inner side of the external shape, the first external connection terminal 14 includes: a first fine metal wire 401 that is finer than the first lead wire 13 and forms a mesh-like pattern; and a second fine metal wire 402 that is thicker than the first fine metal wire 401 and extends in the X direction. This way, on the inner side of the rectangular external shape, a region consisting of the first fine metal wire 401 that is finer than the first lead wire 13 is provided. As a result, the actual area of the first external connection terminal 14 can be reduced as compared to the area of a region surrounded by the rectangular external shape.

Therefore, for example, in a winding step of a roll-to-roll method, the area of a portion where the first external connection terminal 14 is in contact with another touch sensor film is small during winding, the amount of peeling charge generated during unwinding of a roll film in the next step is small, and spark is not likely to occur. In addition, with the configuration where the first external connection terminal 14 includes a large amount of the first fine metal wire 401 portion, the contact probability between so-called conductive balls in the ACF and the first external connection terminal 14 can be improved, and connection reliability between the FPC and the external connection terminal through the ACF is improved. Further, by the first external connection terminal 14 including the second fine metal wire 402 that is thicker than the first fine metal wire 401, the scraping or cutting of the first external connection terminal 14 caused by rubbing is suppressed, and the disconnection probability decreases. As a result, the rub resistance of the first external connection terminal 14 can be improved.

Here, the actual area of the first external connection terminal 14 refers to the area of a region where the first external connection terminal 14 is occupied in a plan view, that is, the area of a projected image in a case where the first external connection terminal 14 is projected to an XY plane in the Z direction. Hereinafter, the area of the projected image will be simply referred to as the area of the first external connection terminal 14.

In addition, as shown in FIG. 2, the substrate 2 includes a plurality of second electrode regions Q2 that extend in the Y direction and are arranged in the X direction on the second surface 2B.

The second conductive layer 3B disposed on the second surface 2B of the substrate 2 includes: a plurality of second detection electrodes 21 that are disposed in the plurality of second electrode regions Q2, respectively, and extend in the Y direction; a plurality of second lead wires 23 that are disposed around the plurality of second detection electrodes 21 and have a number corresponding to the number of the plurality of second detection electrodes 21; and a plurality of second external connection terminals 24 that are electrically connected to the plurality of second lead wires 23. The second detection electrode 21 is connected to one end of the second lead wire 23, and the second external connection terminal 24 is connected to another end of the second lead wire 23. Each of the plurality of second external connection terminals 24 has an elongated shape that extend in a given extension direction from one end connected to the second lead wire 23 to another end. In FIG. 2, each of the plurality of second external connection terminals 24 extends in the X direction. In addition, the plurality of second detection electrodes 21, the plurality of second lead wires 23, and the plurality of second external connection terminals 24 have the same composition as each other. The plurality of second detection electrodes 21, the plurality of second lead wires 23, and the plurality of second external connection terminals 24 are formed at the same time.

One end part of each of the plurality of second lead wires 23 is disposed near an end part of the corresponding second detection electrode 21 on one side in the Y direction, and another end part of each of the plurality of second lead wire 23 is connected to the second external connection terminal 24. One end part of the second lead wire 23 that is disposed near the second detection electrode 21 includes: a wiring part 25 that is disposed around the second detection electrode 21 and has one end part connected to the second external connection terminal 24; and a terminal part 26 that is connected to another end part of the wiring part 25 and extends in the X direction. The terminal part 26 and the second detection electrode 21 are connected to each other in the Y direction. Therefore, the second detection electrode 21 and the second lead wire 23 are electrically connected to each other.

As in the first external connection terminal 14, the second external connection terminal 24 has the configuration of FIG. 4. The effect of the second external connection terminal 24 is the same as the effect of the first external connection terminal 14.

In addition, although not shown in the drawing, the second detection electrode 21 is formed of a plurality of fine metal wires MW formed in the second electrode region Q2, and a mesh-like pattern MP is formed by the plurality of fine metal wires MW as in the first detection electrode 11.

The line widths of the plurality of fine metal wires MW forming the first detection electrode 11 and the plurality of fine metal wires MW forming the second detection electrode 21 are set in a range of preferably 0.5 μm or more and 10.0 μm or less, more preferably 1.0 μm or more and 5.0 μm or less, and still more preferably 1.5 μm or more and 3.0 μm or less so as to make the fine metal wires inconspicuous to an observer, that is, to secure visibility.

In addition, in order to secure sufficient conductivity, the line widths of the first lead wires 13 and the second lead wires 23 are preferably 2.0 μm to 100 μm and more preferably 3.0 μm to 20 μm.

In addition, from the viewpoint of preventing a failure such as disconnection in a case where the touch sensor film 1 is folded and the viewpoint of obtaining sufficient conductivity, the thicknesses of the first detection electrode 11 and the first lead wire 13 and the thicknesses of the second detection electrode 21 and the second lead wire 23 are preferably 0.01 μm to 10.0 μm, more preferably 0.05 μm to 5.0 μm, and still more preferably 0.10 μm to 2.5 μm.

In addition, in the touch sensor film 1, the first conductive layer 3A is disposed on the first surface 2A of the substrate 2, and the second conductive layer 3B is disposed on the second surface 2B of the substrate 2. However, the touch sensor film 1 may include only any one of the first conductive layer 3A or the second conductive layer 3B. Even in this case, as in the case where the touch sensor film 1 includes both of the first conductive layer 3A and the second conductive layer 3B, the generation of spark in the first conductive layer 3A or the second conductive layer 3B can be suppressed, and a failure of the touch sensor film 1 can be suppressed.

In addition, in the above description, the first detection electrode 11 and the second detection electrode 21 have the rhombic mesh-like pattern MP. The shape of an opening of the mesh is not limited to a rhombic shape and may be a regular triangular shape, a regular quadrangular shape, a regular hexagonal shape, other regular polygonal shapes, or a polygonal shape having a random shape or may be a shape having a curve.

In addition, as shown in FIGS. 2 and 3, the first electrode region Qi and the second electrode region Q2 have a rectangular shape. As long as a touch operation can be detected by the first detection electrode 11 and the second detection electrode 21, the shape of the first electrode region Q1 and the shape of the second electrode region Q2 are not particularly limited.

In addition, in the above description, the plurality of first external connection terminals 14 extend in the same direction. The extension directions of the plurality of first external connection terminals 14 are not particularly limited and may be different from each other. The extension directions of the plurality of second external connection terminals 24 are not particularly limited and may be the same as or different from each other. In addition, relationships between the extension directions of the plurality of first external connection terminals 14 and the extension directions of the plurality of second external connection terminals 24 are not particularly limited and may be the same as or different from each other.

Embodiment 2

Figure 5:
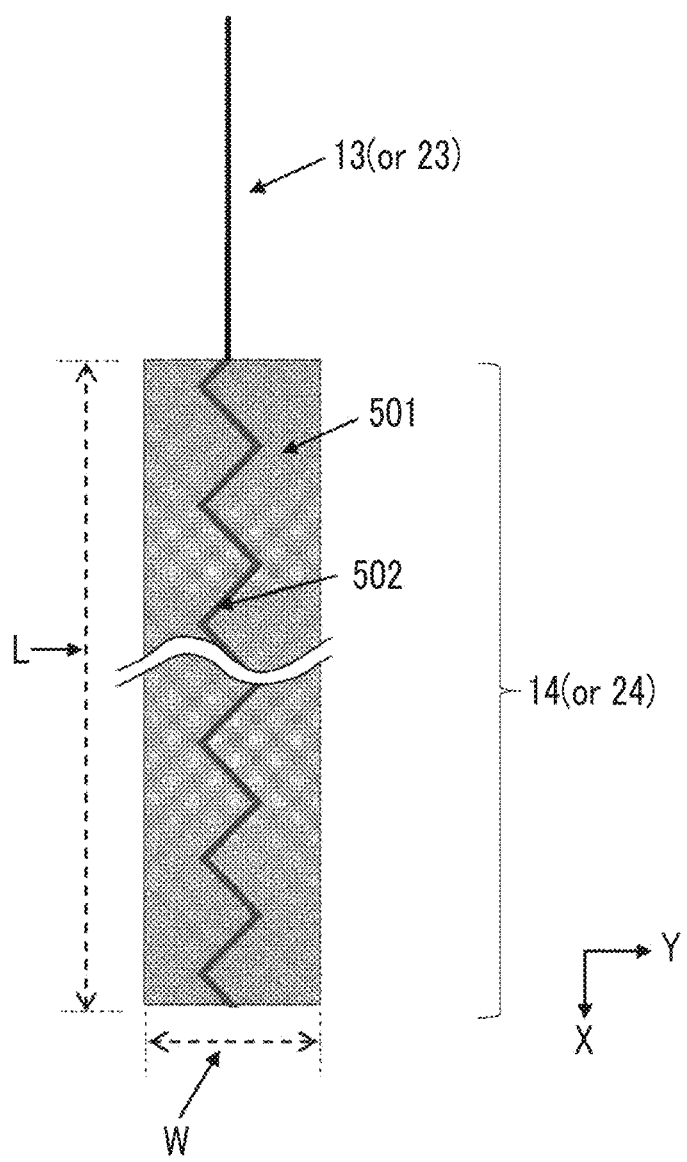
FIG. 5 is an enlarged plan view showing an external connection terminal of a touch sensor film according to Embodiment 2 of the present invention.

In Embodiment 2, it is preferable that the first external connection terminal 14 and the second external connection terminal 24 have a shape of FIG. 5. The first external connection terminal 14 and the second external connection terminal 24 are configured to include: a first fine metal wire 501 that is finer than the first lead wire 13 and the second lead wire 23; and a second fine metal wire 502 that is thicker than the first fine metal wire 501. As a result, as in Embodiment 1, the areas of the first external connection terminal 14 and the second external connection terminal 24 can be improved to improve spark resistance. In particular, the connection reliability can be improved by the first fine metal wire 501, and rub resistance can be secured by the second fine metal wire 502 thicker than the first fine metal wire 501. In FIG. 4, by disposing the second fine metal wire 502 in a zigzag manner with respect to a longitudinal direction of the terminal, for example, in a case where a force to draw the terminal portion works, the terminal portion is not likely to be disconnected, and handleability and work resistance are improved, which is preferable.

Embodiment 3

Figure 6:
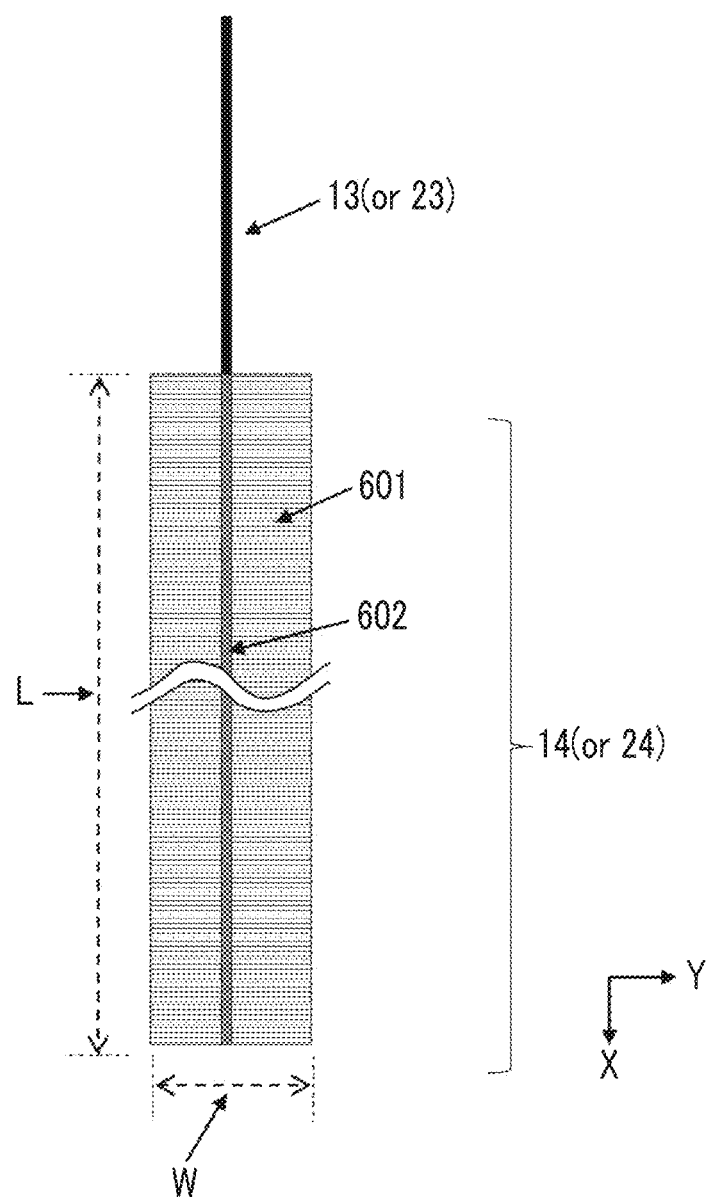
FIG. 6 is an enlarged plan view showing an external connection terminal of a touch sensor film according to Embodiment 3 of the present invention.

In Embodiment 3, it is preferable that the first external connection terminal 14 and the second external connection terminal 24 have a shape of FIG. 6. The first external connection terminal 14 and the second external connection terminal 24 are configured to include: a first fine metal wire 601 that is finer than the first lead wire 13 and the second lead wire 23 and form a plurality of linear patterns; and a second fine metal wire 602 that is thicker than the first fine metal wire 601. As a result, as in Embodiment 1, the areas of the first external connection terminal 14 and the second external connection terminal 24 can be improved to improve spark resistance. In particular, the connection reliability can be improved by the first fine metal wire 601, and rub resistance can be secured by the second fine metal wire 602 thicker than the first fine metal wire 601. By making the first fine metal wire 601 linear, the number of wires capable of actively contributing to the contact with the conductive balls in the ACF in the same area can be increased, and by increasing the contact probability with the conductive balls in the ACF, higher connection reliability between the FPC and the first external connection terminal 14 and the second external connection terminal 24 can be obtained.

Embodiment 4

Figure 7:
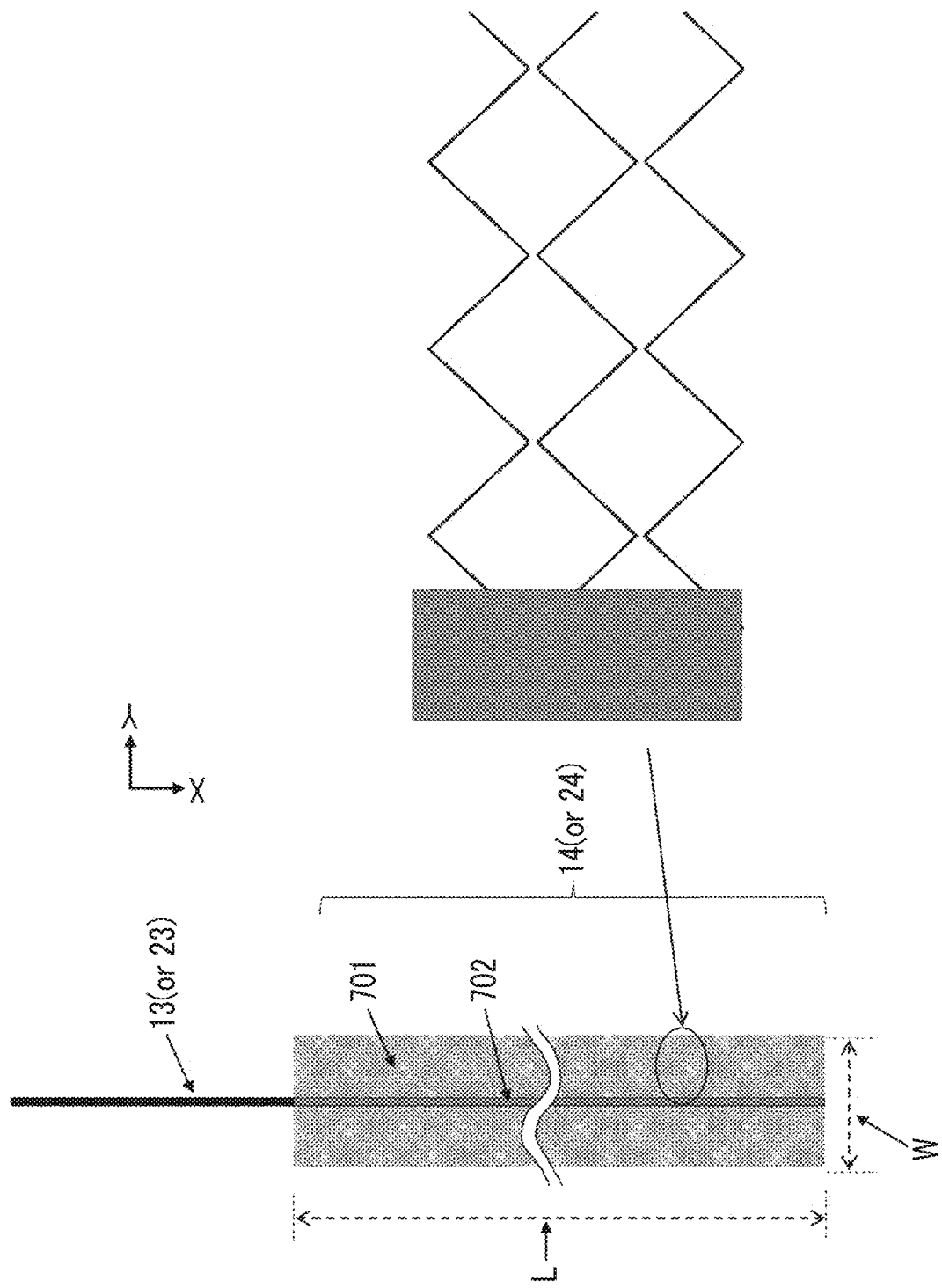
FIG. 7 is an enlarged plan view showing an external connection terminal of a touch sensor film according to Embodiment 4 of the present invention.

In Embodiment 4, it is preferable that the first external connection terminal 14 and the second external connection terminal 24 have a shape of FIG. 7. The first external connection terminal 14 and the second external connection terminal 24 are configured to include: a first fine metal wire 701 that is finer than the first lead wire 13 and the second lead wire 23 and form a mesh-like pattern; and a second fine metal wire 702 that is thicker than the first fine metal wire 701. As a result, as in Embodiment 1, the areas of the first external connection terminal 14 and the second external connection terminal 24 can be improved to improve spark resistance. In particular, the connection reliability can be improved by the finer first fine metal wire 701, and rub resistance can be secured by the second fine metal wire 702 thicker than the first fine metal wire 701. In FIG. 4, a plurality of finer first fine metal wires 701 are not electrically connected to each other, and while maintaining the connection reliability between the FPC and the first external connection terminal 14 and the second external connection terminal 24, the area of the connecting part can be further reduced, and spark resistance can be increased. The first external connection terminal 14 and the second external connection terminal 24 in Embodiment 4 do not have a pattern as a closed figure (are formed in a pattern formed of a non-closed figure).

Embodiment 5

Figure 8:
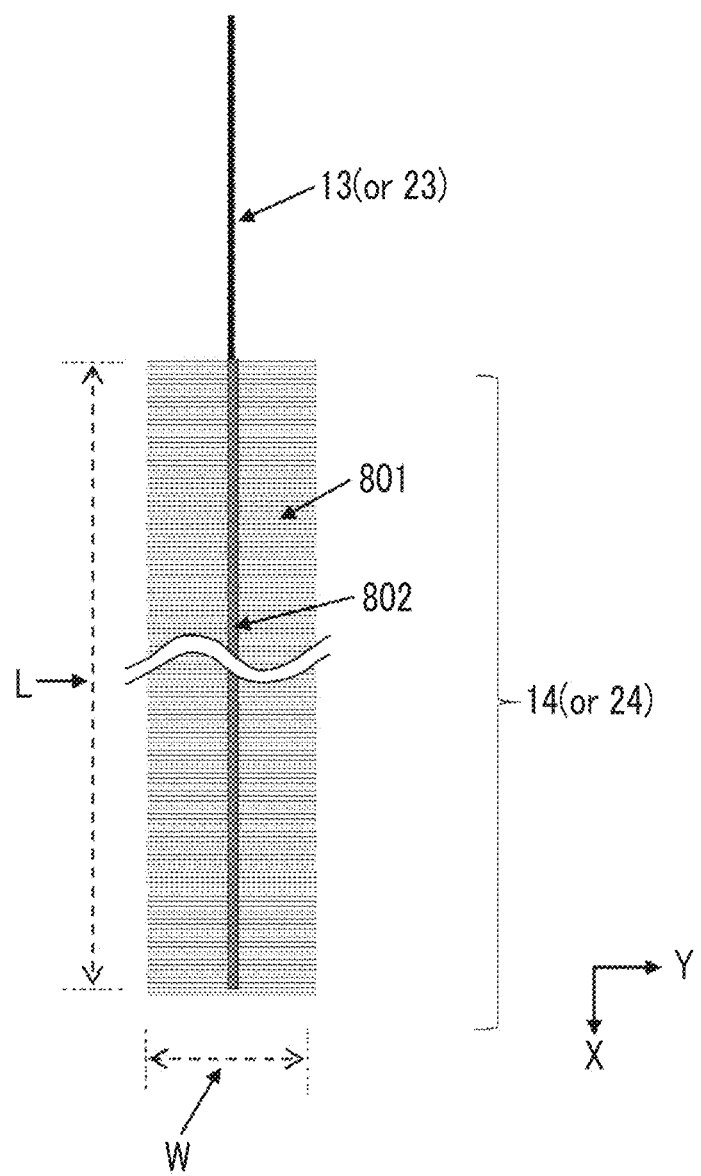
FIG. 8 is an enlarged plan view showing an external connection terminal of a touch sensor film according to Embodiment 5 of the present invention.

In Embodiment 5, it is preferable that the first external connection terminal 14 and the second external connection terminal 24 have a shape of FIG. 8. The first external connection terminal 14 and the second external connection terminal 24 are configured to include: a first fine metal wire 801 that is finer than the first lead wire 13 and the second lead wire 23 and form a plurality of linear patterns; and a second fine metal wire 802 that is thicker than the first fine metal wire 801. As a result, as in Embodiment 1, the areas of the first external connection terminal 14 and the second external connection terminal 24 can be improved to improve spark resistance. In particular, the connection reliability can be improved by the first fine metal wire 801, and rub resistance can be secured by the second fine metal wire 802 thicker than the first fine metal wire 801. In FIG. 6, a plurality of finer first fine metal wires 801 are not directly connected to each other, and while maintaining the connection reliability between the FPC and the first external connection terminal 14 and the second external connection terminal 24, the area of the connecting part can be further reduced, and spark resistance can be increased. The first external connection terminal 14 and the second external connection terminal 24 in Embodiment 5 do not have a pattern as a closed figure (are formed in a pattern formed of a non-closed figure).

Embodiment 6

Figure 9:
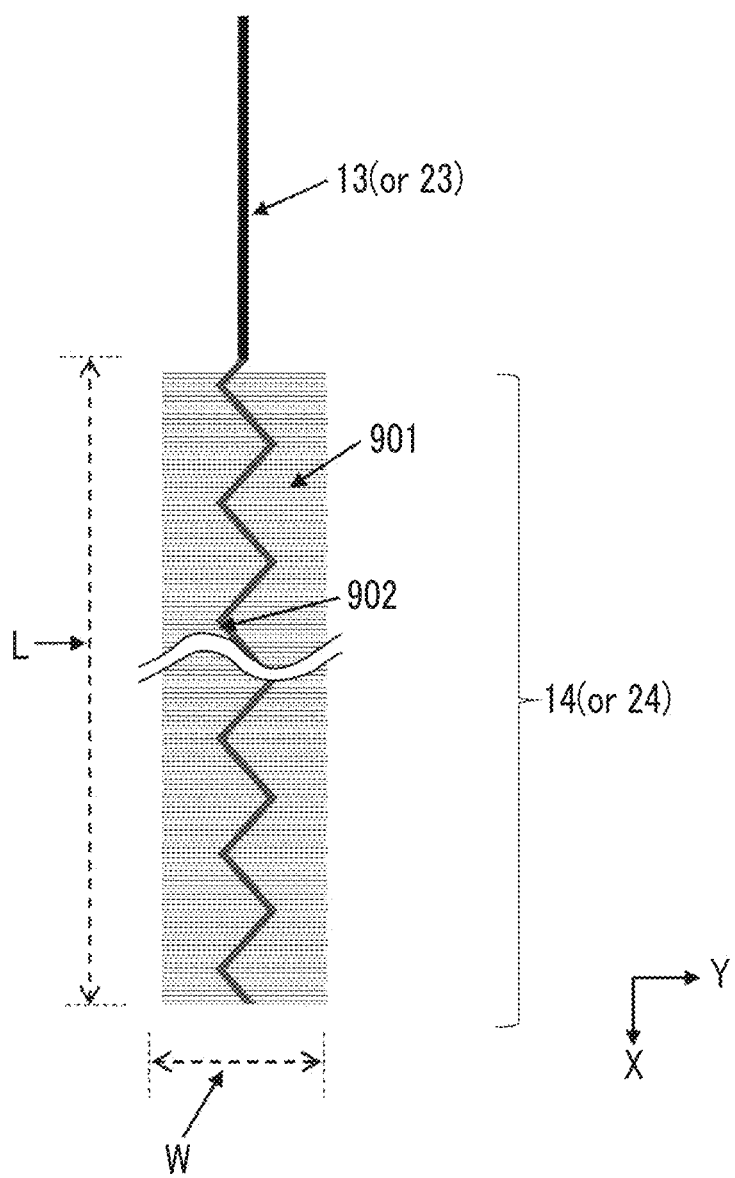
FIG. 9 is an enlarged plan view showing an external connection terminal of a touch sensor film according to Embodiment 6 of the present invention.

In Embodiment 6, it is preferable that the first external connection terminal 14 and the second external connection terminal 24 have a shape of FIG. 9. The first external connection terminal 14 and the second external connection terminal 24 are configured to include: a first fine metal wire 901 that is finer than the first lead wire 13 and the second lead wire 23 and form a plurality of linear patterns; and a second fine metal wire 902 that is thicker than the first fine metal wire 901. As a result, as in Embodiment 1, the areas of the first external connection terminal 14 and the second external connection terminal 24 can be improved to improve spark resistance. In particular, the connection reliability can be improved by the first fine metal wire 901, and rub resistance can be secured by the second fine metal wire 902 thicker than the first fine metal wire 901. In FIG. 8, by disposing the second fine metal wire 902 in a zigzag manner with respect to a longitudinal direction of the terminal, for example, in a case where a force to draw the terminal portion works, the terminal portion is not likely to be disconnected, and handleability and work resistance are improved. In addition, in FIG. 6, a plurality of finer first fine metal wires 901 are not directly connected to each other, and while maintaining the connection reliability between the FPC and the first external connection terminal 14 and the second external connection terminal 24, the area of the connecting part can be further reduced, and spark resistance can be increased. The first external connection terminal 14 and the second external connection terminal 24 in Embodiment 6 do not have a pattern as a closed figure (are formed in a pattern formed of a non-closed figure).

Embodiment 7

Figure 10:
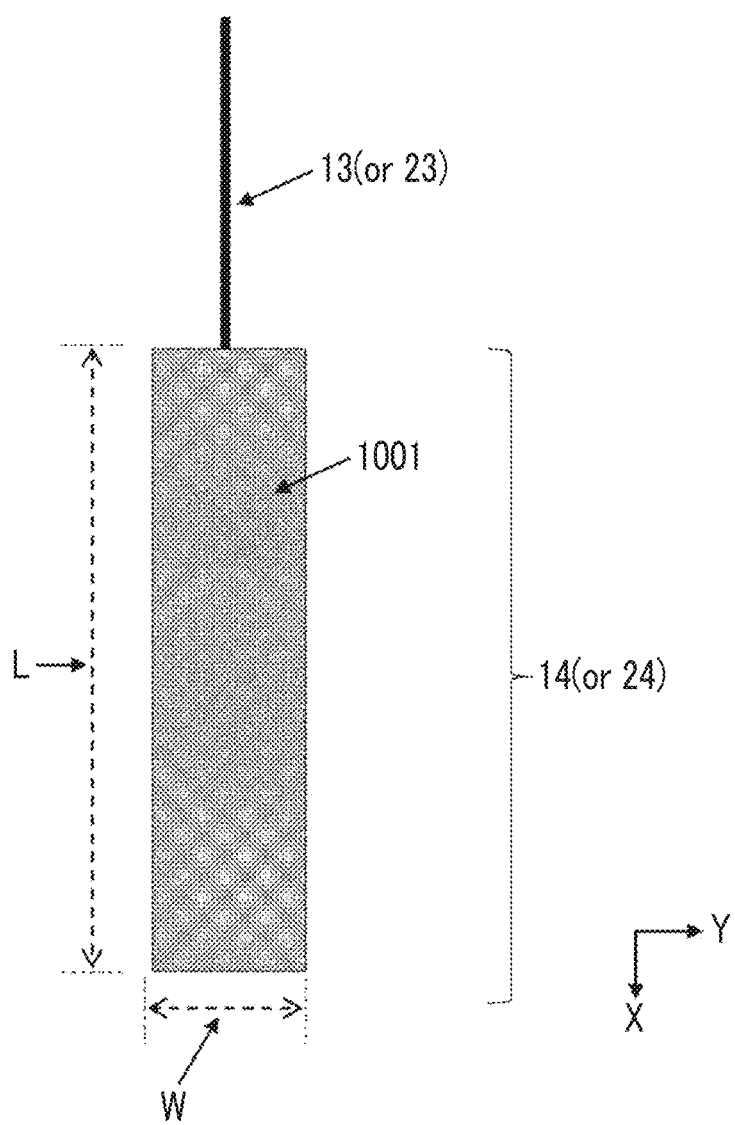
FIG. 10 is an enlarged plan view showing an external connection terminal of a touch sensor film according to Embodiment 7 of the present invention.

In Embodiment 7, it is preferable that the first external connection terminal 14 and the second external connection terminal 24 have a shape of FIG. 10. The first external connection terminal 14 and the second external connection terminal 24 are configured to include a first fine metal wire 1001 that is finer than the first lead wire 13 and the second lead wire 23 and form a mesh-like pattern. As a result, as in Embodiment 1, the areas of the first external connection terminal 14 and the second external connection terminal 24 can be improved to improve spark resistance. In particular, the connection reliability is improved by the finer first fine metal wire 1001.

Embodiment 8

Figure 11:
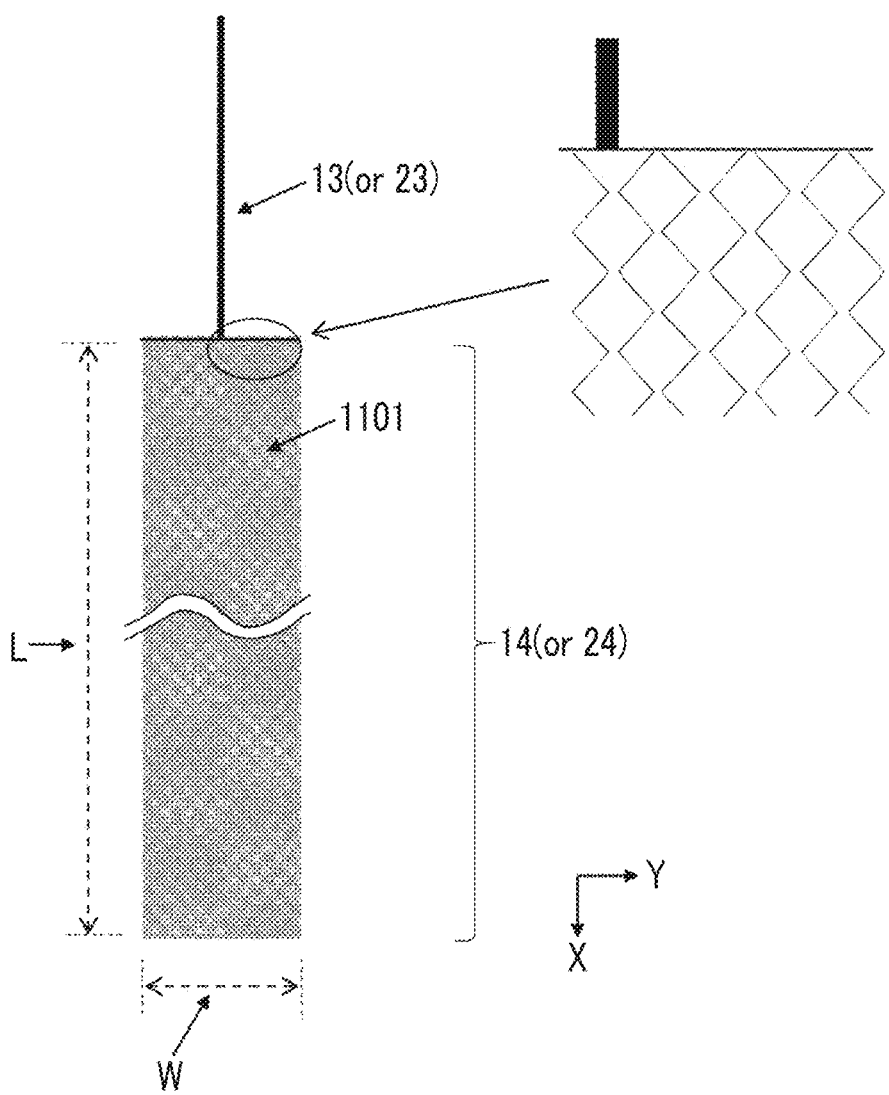
FIG. 11 is an enlarged plan view showing an external connection terminal of a touch sensor film according to Embodiment 8 of the present invention.

In Embodiment 8, it is preferable that the first external connection terminal 14 and the second external connection terminal 24 have a shape of FIG. 11. The first external connection terminal 14 and the second external connection terminal 24 are configured to include a first fine metal wire 1101 that is finer than the first lead wire 13 and the second lead wire 23 and form a mesh-like pattern. As a result, as in Embodiment 1, the areas of the first external connection terminal 14 and the second external connection terminal 24 can be improved to improve spark resistance. In particular, the connection reliability is improved by the finer first fine metal wire 1101. In addition, in FIG. 10, a plurality of first fine metal wires 1101 are not electrically connected to each other in the horizontal direction, and while maintaining the connection reliability between the FPC and the first external connection terminal 14 and the second external connection terminal 24, the area of the connecting part can be further reduced, and spark resistance can be increased. The first external connection terminal 14 and the second external connection terminal 24 in Embodiment 8 do not have a pattern as a closed figure (are formed in a pattern formed of a non-closed figure).

Embodiment 9

Figure 12:
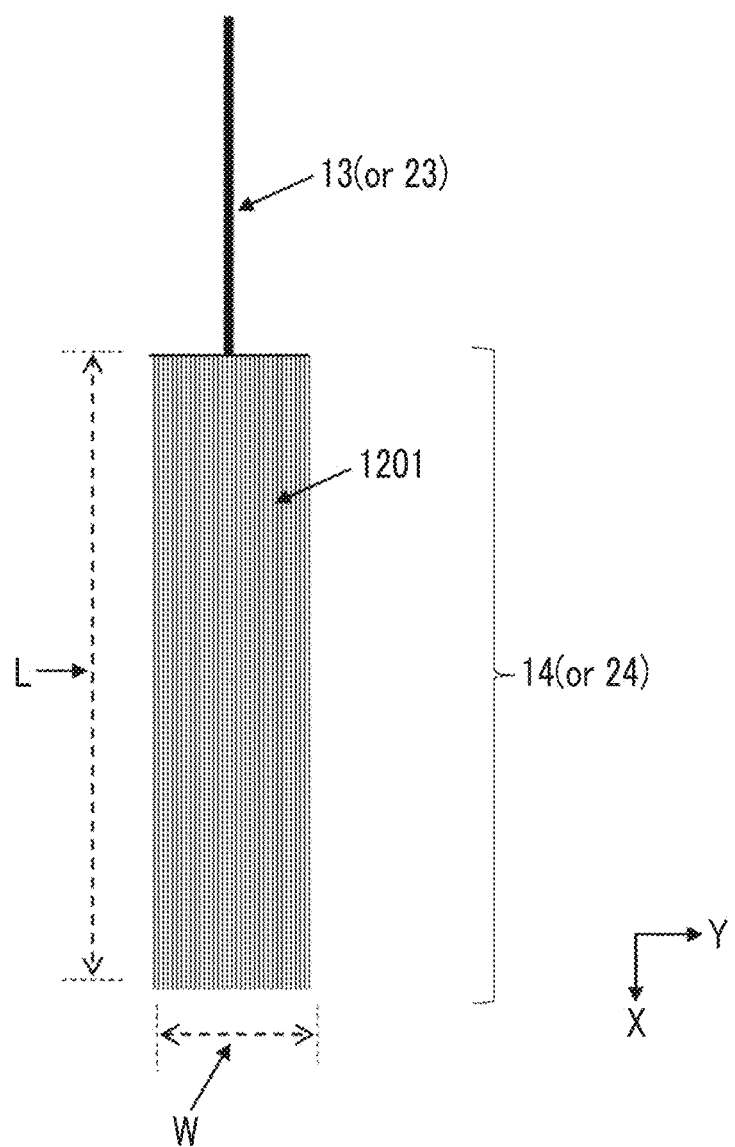
FIG. 12 is an enlarged plan view showing an external connection terminal of a touch sensor film according to Embodiment 9 of the present invention.

In Embodiment 9, it is preferable that the first external connection terminal 14 and the second external connection terminal 24 have a shape of FIG. 12. The first external connection terminal 14 and the second external connection terminal 24 are configured to include a first fine metal wire 1201 that is finer than the first lead wire 13 and the second lead wire 23 and form a plurality of linear patterns. As a result, as in Embodiment 1, the areas of the first external connection terminal 14 and the second external connection terminal 24 can be improved to improve spark resistance. In particular, the connection reliability is improved by the finer first fine metal wire 1201. By making the first fine metal wire 1201 linear, the number of the first fine metal wires 1201 capable of actively contributing to the contact with the conductive balls in the ACF in the same area can be increased, and by increasing the contact probability with the conductive balls in the ACF, higher connection reliability between the FPC and the first external connection terminal 14 and the second external connection terminal 24 can be obtained. The first external connection terminal 14 and the second external connection terminal 24 in Embodiment 9 do not have a pattern as a closed figure (are formed in a pattern formed of a non-closed figure).

In Embodiments 1 to 9, the first external connection terminal 14 and the second external connection terminal 24 may have the same shape or may have different shapes. In addition, even in a case where each of the plurality of first external connection terminals 14 and the plurality of second external connection terminals 24 partially has the configuration according to the present invention, the connection reliability between the FPC and the touch sensor film 1 can be improved, spark resistance during the manufacturing of the touch sensor film 1 can be improved, and rub resistance can be improved. In addition, regarding the plurality of first external connection terminals 14 and the plurality of second external connection terminals 24, even in a case where external connection terminals having different shapes are combined, the connection reliability between the FPC and the touch sensor film 1 can be improved, spark resistance during the manufacturing of the touch sensor film 1 can be improved, and rub resistance can be improved.

In the first external connection terminal 14 and the second external connection terminal 24 having the configurations of FIGS. 4 to 9, as the areas of the second fine metal wires 402, 502, 602, 702, 802, and 902 increase, the rub resistance is improved. On the other hand, in a case where the number of the thick second fine metal wires increases, the area of the external connection terminals increases such that spark resistance deteriorates. In a case where the areas of the first external connection terminal 14 and the second external connection terminal 24 decrease, the number of fine wires in the first external connection terminal 14 and the second external connection terminal 24 decreases, and the contact probability with the conductive balls in the ACF decreases. Therefore, the connection reliability between the FPC and the first external connection terminal 14 and the second external connection terminal 24 through the ACF decreases. The length of a thick wire portion (portion having a line width that is more than or equal to the line widths of the first lead wire 13 and the second lead wire 23) is preferably 0.7 L or more and 1.5 L or less and more preferably 1 L or more and 1.2 L or less in the first external connection terminal 14 and the second external connection terminal 24 (width W, length L). The line width of the second fine metal wires 402, 502, 602, 702, 802, and 902 is preferably 5 μm to 20 μm and more preferably 5 μm to 10 μm.

In the first external connection terminal 14 and the second external connection terminal 24 having the configurations of FIGS. 4 to 12, as the first fine metal wires 401, 501, 601, 701, 801, 901, 1001, 1101, and 1201 become finer, the areas of the first external connection terminal 14 and the second external connection terminal 24 can be reduced, and the number of fine metal wires in the same area can increase. Therefore, spark can be easily prevented, and the connection reliability between the FPC and the first external connection terminal 14 and the second external connection terminal 24 can be improved. However, as the first fine metal wires becomes finer, the rub resistance deteriorates. The line width of the first fine metal wires 401, 501, 601, 701, 801, 901, 1001, 1101, and 1201 is preferably 1 μm to 5 μm and more preferably 1.2 μm to 2.0 μm.

In the configurations and the like of FIGS. 4 to 12, by adjusting the area per unit length of the first external connection terminal 14 and the second external connection terminal 24 in the extension direction in a plan view to be less than 5.5 times and preferably less than 3 times with respect to the area of the pattern per unit length of the first lead wire 13 and the second lead wire 23 connected to the first external connection terminal 14 and the second external connection terminal 24 in a plan view, conduction failure caused by spark can be suppressed. The lower limit is not particularly limited, and it may be adjusted to 1 time or more. Here, the area per unit length in the extension direction can be calculated as, for example, the area per length of 0.5 mm in the extension direction.

In the configurations and the like of FIGS. 4 to 8, the thicknesses of the first external connection terminal 14 and the second external connection terminal 24 are not particularly limited. However, in a case where the thicknesses are excessively small, risk of breakage during handling or connection processing and risk of disconnection during extension increase. The thicknesses of the first external connection terminal 14 and the second external connection terminal 24 are preferably 0.5 μm or more, more preferably 1 μm or more, and still more preferably 1.2 μm or more. On the other hand, in a case where the thicknesses of the first external connection terminal 14 and the second external connection terminal 24 are excessively large, protrusion from a portion having no pattern is likely to be large, and the surface pressure in the first external connection terminal 14 and the second external connection terminal 24 during film lamination is high. Therefore, spark failure is likely to occur. Accordingly, the thicknesses of the first external connection terminal 14 and the second external connection terminal 24 are preferably 3 μm or less and more preferably 2 μm or less. The heights (heights of the protrusions) of the first external connection terminal 14 and the second external connection terminal 24 from the substrate are preferably 1.5 μm or less and more preferably 1 μm or less.

Hereinafter, each of the members forming the touch sensor film 1 according to Embodiment 1 will be described. It is assumed that the description of each of the members forming the touch sensor films according to Embodiments 2 to 5 conforms to that of each of the members forming the touch sensor film 1 according to Embodiment 1.

Substrate

The substrate 2 is not particularly limited as long as it is transparent, has electric insulating characteristics, and supports the first conductive layer 3A and the second conductive layer 3B. For example, a resin substrate or a glass substrate is used. More specifically, as a material for forming the substrate 2, for example, glass, reinforced glass, non-alkali glass, polyethylene terephthalate (PET), polyethylene naphthalate (PEN), a cyclo-olefin polymer (COP), a cyclic olefin copolymer (COC), polycarbonate (PC), an acrylic resin, polyethylene (PE), polypropylene (PP), polystyrene (PS), polyvinyl chloride (PVC), polyvinylidene chloride (PVDC), or cellulose triacetate (TAC) can be used. The thickness of a transparent insulating substrate 5 is, for example, preferably 20 μm to 1100 μm and more preferably 20 μm to 500 μm. In particular, in a case where an organic resin substrate such as PET is used, the thickness is preferably 20 μm to 200 μm and more preferably 30 μm to 100 μm.

The total light transmittance of the substrate 2 is preferably 40% to 100%. The total light transmittance is measured using "Plastics—Determination of Total Luminous Transmittance And Reflectance" defined by JIS K 7375:2008.

Examples of a preferable aspect of the substrate 2 include a treated substrate that undergoes at least one treatment selected from the group consisting of an atmospheric pressure plasma treatment, a corona discharge treatment, and an ultraviolet irradiation treatment. By performing, the above-described treatment, a hydrophilic group such as an OH group is introduced into the treated surface of the transparent insulating substrate 5. As a result, the adhesiveness between the substrate 2 and the first conductive layer 3A and the adhesiveness between the substrate 2 and the second conductive layer 3B are improved. In addition, the atmospheric pressure plasma treatment is preferable among the above-described treatments from the viewpoint of further improving the adhesiveness between the substrate 2 and the first conductive layer 3A and the adhesiveness between the substrate 2 and the second conductive layer 3B.

Undercoat Layer

In order to improve the adhesiveness between the substrate 2 and the first conductive layer 3A and the adhesiveness between the substrate 2 and the second conductive layer 3B, an undercoat layer can also be disposed between the substrate 2 and the first conductive layer 3A and between the substrate 2 and the second conductive layer 3B. This undercoat layer includes a polymer such that the adhesiveness between the substrate 2 and the first conductive layer 3A and the adhesiveness between the substrate 2 and the second conductive layer 3B are further improved.

A method of forming the undercoat layer is not particularly limited, and examples thereof include a method of applying a composition for forming an undercoat layer including a polymer to the substrate and optionally performing a heat treatment thereon. In addition, as a composition for forming an undercoat layer including a polymer, for example, gelatin, an acrylic resin, a urethane resin, or an acrylic styrene latex including fine particles of an inorganic material or a polymer may be used.

Optionally, in the touch sensor film 1, as a layer other than the above-described undercoat layer, a refractive index adjusting layer may be provided between the substrate 2 and the first conductive layer 3A and between the substrate 2 and the second conductive layer 3B. As the refractive index adjusting layer, for example, an organic layer to which particles of a metal oxide such as zirconium oxide for adjusting a refractive index can be used.

Conductive Layer and Connecting Part

The first conductive layer 3A including the plurality of first detection electrodes 11, the plurality of first lead wires 13, and the plurality of first external connection terminals 14 and the second conductive layer 3B including the plurality of second detection electrodes 21, the plurality of second lead wires 23, and the plurality of second external connection terminals 24 can be formed of a metal or an alloy, for example, copper, aluminum, or silver as a forming material. The alloy may include, for example, gold, silver, or copper. In addition, the first conductive layer 3A, the second conductive layer 3B, and a connecting part C1 may include metallic silver, gelatin, or a polymer binder such as an acrylic styrene latex. Other preferable examples of the material include a metal and an alloy of aluminum, silver, molybdenum, and titanium. In addition, a laminated structure of the materials may be used. For example, a laminated structure such as molybdenum/copper/molybdenum or molybdenum/aluminum/molybdenum can be used. In addition, the first conductive layer 3A and the second conductive layer 3B may include metal oxide particles, a metal paste such as a silver paste or a copper paste, or metal nanowire particles such as silver nanowire or copper nanowire.

In addition, in order to improve the visibility of the fine metal wires MW forming the first detection electrode 11 and the second detection electrode 21, a blackening layer may be formed on surfaces of the fine metal wires MW that are recognized by an observer. As the blackening layer, a metal oxide, a metal nitride, a metal oxynitride, or a metal sulfide can be used. Representatively, for example, copper oxynitride, copper nitride, copper oxide, or molybdenum oxide can be used.

Next, a method of forming the first conductive layer 3A and the second conductive layer 3B will be described. As the first conductive layer 3A and the second conductive layer 313, for example, a sputtering method, a plating method, a silver halide method, or a printing method can be appropriately used.

A method of forming the first conductive layer 3A and the second conductive layer 3B using a sputtering method will be described. First, by forming a layer of a conductive material by sputtering and forming a wiring line using the layer of the conductive material by photolithography, the first conductive layer 3A and the second conductive layer 3B can be formed. The layer of the conductive material can also be firmed by so-called vapor deposition instead of sputtering. As the layer of the conductive material, an electrolytic metal foil can be used in addition sputtering or vapor deposition. More specifically, a step of forming a copper wiring line described in JP2014-29614A can be used.

A method of forming the first conductive layer 3A and the second conductive layer 3B using a plating method will be described. For example, the first conductive layer 3A and the second conductive layer 3B can be formed using a metal plating film that is formed on an electroless plating underlayer by performing electroless plating on the underlayer. In this case, the first conductive layer 3A and the second conductive layer 3B are formed by forming a catalyst ink including at least metal fine particles on a substrate in a patterned manner and dipping the substrate in an electroless plating bath to form a metal plating film. More specifically, a method of manufacturing a metal-coated substrate described in JP2014-159620A can be used.

In addition, the first conductive layer 3A and the second conductive layer 3B are formed by forming a resin composition having at least a functional group capable of interacting a metal catalyst precursor on a substrate in a patterned manner, adding a catalyst or catalyst precursor, and dipping the substrate in an electroless plating bath to form a metal plating film. More specifically, a method of manufacturing a metal-coated substrate described in JP2012-144761A can be used. In addition, the first conductive layer 3A and the second conductive layer 3B may be formed by performing electroless plating on a wiring pattern that is formed using a silver halide method. In this case, the first conductive layer 3A and the second conductive layer 3B are formed by forming a pattern formed of silver particles through steps including steps of exposing and developing a film to which a photographic sensitive material is applied and optionally including a gelatin removal step and performing electroless silver or copper plating on the formed pattern to form a metal plating film. More specifically, a manufacturing method described in WO2015/158494A, WO2021/059812A, or WO2021/065226A can be applied.

A method of forming the first conductive layer 3A and the second conductive layer 3B using a silver halide method will be described. First, by exposing a silver halide emulsion layer including silver halide using an exposure pattern for forming the first conductive layer 3A and the second conductive layer 3B and developing the exposed silver halide layer, the first conductive layer 3A and the second conductive layer 3B can be formed. More specifically, a method of manufacturing the first conductive layer 3A and the second conductive layer 3B described in JP2012-6377A, JP2014-112512A, JP2014-209332A, JP2015-22397A, JP2016-192200A, or WO2016/157585A can be used.

A method of forming the first conductive layer 3A and the second conductive layer 3B using a printing method will be described. First, by applying a conductive paste including conductive powder to a substrate in the same pattern as the first conductive layer 3A and the second conductive layer 3B and healing the conductive paste, the first conductive layer 3A and the second conductive layer 3B can be formed. The pattern formation using the conductive paste is performed, for example, using an ink jet method or a screen printing method. As the conductive paste, more specifically, a conductive paste described in JP2011-28985A can be used.

EXAMPLES

The present invention will be described in more detail based on the following examples. Materials, used amounts, ratios, treatment details, and treatment procedures shown in the following examples can be appropriately changed within a range not departing from the scope of the present invention. Accordingly, the scope of the present invention is not limited to the following examples.

Example 1

Preparation of Silver Halide Emulsion

The following solution 2 and the following solution 3 were simultaneously added for 20 minutes to the following solution 1 held at pH 4.5 and 38° C. in amounts corresponding to 90% of the entire amounts while stirring the solutions. As a result, nuclear particles having a size of 0.16 μm were formed. Next, the following solution 4 and the following solution 5 were added for 8 minutes, and the remaining 10% amounts of the solution 2 and the solution 3 were further added for 2 minutes. As a result, the nuclear particles grew to a size of 0.21 μm. Further, 0.15 g of potassium iodide was added, and the particles were aged for 5 minutes. Then the formation of the particles was completed.

Solution 1

Water: 750 ml
Gelatin: 8.6 g
Sodium chloride: 3 g
1,3-Dimethylimidazolidine-2-thione: 20 mg
Sodium benzenethiolsulfonate: 10 mg
Citric acid: 0.7 g
Solution 2
Water: 300 ml
Silver nitrate: 150 g
Solution 3
Water: 300 ml
Sodium chloride: 38 g Potassium bromide: 32 g
Potassium hexachloroiridate(III) (0.005% KCl 20% aqueous solution): 5 ml
Ammonium hexachlororhodate (0.001% NaCl 20% aqueous solution): 7 ml
Solution 4
Water: 100 ml
Silver nitrate: 50 g
Solution 5
Water: 100 ml
Sodium chloride: 13 g
Potassium bromide: 11 g
Yellow prussiate of potash: 5 mg Next, the particles were cleaned with water by flocculation using an ordinary method. Specifically, the temperature was decreased to 35° C., and the pH was decreased (to be in a range of pH 3.6±0.2) using sulfuric acid until silver halide precipitated. Next, about 3 L of the supernatant liquid was removed (first water cleaning). Further, 3 L of distilled water was added, and sulfuric acid was added until silver halide precipitated. Next, about 3 L of the supernatant liquid was removed again (second water cleaning). By repeating the same operation as the second cleaning once more (third water cleaning), the water cleaning and desalting step was completed. After the water cleaning and desalting, the emulsion was adjusted to pH 6.4 and pAg 7.5, 2.5 g of gelatin, 10 mg of sodium benzenethiolsulfonate, 3 mg of sodium benzenethiosulfinate, 15 mg of sodium thiosulfate, and 10 mg of chloroauric acid were added, and chemosensitization was performed at 55° C. to obtain the optimum sensitivity. Next, 100 mg of 1,3,3a,7-tetraazaindene as a stabilizer and 100 mg of PROXEL (trade name, manufactured by ICI Co., Ltd.) as a preservative were added. The finally obtained emulsion was a silver chloroiodobromide cubic particle emulsion having an average particle diameter of 0.22 μm and a coefficient of variation of 9%, in which the content of silver iodide was 0.08 mol %, and the ratio of silver chlorobromide was 70 mol % of silver chloride/30 mol % of silver bromide.

Preparation of Composition for Forming Photosensitive Layer $1.2 \times 10^{-4}$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, 0.90 g/mol Ag of 2,4-dichloro-6-hydroxy-1,3,5-triazine sodium salt, and a small amount of a hardening agent were added to the emulsion, and the pH of the coating solution was adjusted to 5.6 using citric acid.

A polymer latex including a polymer represented by (P-1) shown below as an example and a dispersant formed of dialkylphenyl PEO sulfuric acid ester (a mass ratio dispersant/polymer was 2.0/100=0.02) was added to the coating solution such that a mass ratio polymer/gelatin of the polymer to the gelatin in the coating solution was 0.5/1.

Further, EPOXY RESIN DY022 (trade name, manufactured by Nagase ChemteX Corporation) as a crosslinking agent was added. The addition amount of the crosslinking agent was adjusted such that the amount of the crosslinking agent in the silver halide-containing photosensitive layer described below was 0.09 g/m².

This way, the composition for forming a photosensitive layer was prepared. The polymer represented by (P-1) shown below as an example was synthesized with reference to JP3305459B and JP3754745B.

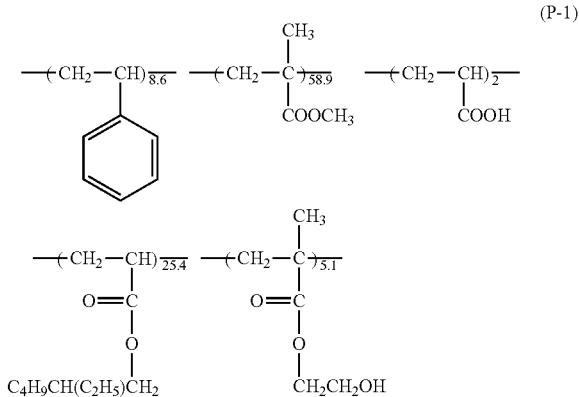

(P-1)

Photosensitive Layer Forming Step

A corona discharge treatment was performed on an insulating substrate, a gelatin layer having a thickness of 0.1 μm as a undercoat layer was provided on opposite surfaces of the insulating substrate, and an antihalation layer including a dye having an optical density of about 1.0 and decolorized by an alkali developer was provided on the undercoat layer. The composition for forming a photosensitive layer was applied to the antihalation layer, and a gelatin layer having a thickness of 0.15 μm was further provided. As a result, an insulating substrate having opposite surfaces on which the photosensitive layer was formed was obtained. An insulating substrate having opposite surfaces on which the photosensitive layer was formed was set as a film A. In the formed photosensitive layer, the silver content was 6.0 g/m$^2$, and the gelatin content was 1.0 g/m$^2$.

Exposure Development Step

A photomask corresponding to the pattern of the plurality of first detection electrodes 11, the plurality of first lead wires 13, and the plurality of first external connection terminals 14 according to the embodiments shown in FIGS. 2, 3, and 10 was disposed on one surface of the film A, a photomask corresponding to the pattern of the plurality of second detection electrodes 21, the plurality of second lead wires 23, and the plurality of second external connection terminals 24 was disposed on another surface of the film A, and each of both of the surfaces of the film A were exposed using parallel light from a high pressure mercury lamp as a light source. After the exposure, the surfaces of the film A were developed using the following developer and were developed using a fixing solution (trade name; N3X-R for CN16X, manufactured by Fuji Film Co., Ltd.). Further, the film A was rinsed with pure water and was dried. As a result, an insulating substrate having opposite surfaces on which the conductive member formed of Ag wire and the gelatin layer were formed was obtained. The gelatin layer was formed between the Ag wires. The obtained film was set as a film B.

Composition of Developer

1 L of the developer included the following compounds.
Hydroquinone: 0.037 mol/L
N-methylamino phenol: 0.016 mol/L
Sodium metaborate: 0.140 mol/L
Sodium hydroxide: 0.360 mol/L
Sodium bromide: 0.031 mol/L
Potassium metabisulfite: 0.187 mol/L

Gelatin Decomposition Treatment

The film B was dipped in an aqueous solution (concentration of protease: 0.5 mass %; liquid temperature: 40° C.) of protease (BIOPRASE AL-15FG, manufactured by Nagase ChemteX Corporation) for 120 seconds. The film B was taken out from the aqueous solution, was dipped in warm water (liquid temperature: 50° C.) for 120 seconds, and was cleaned. The film having undergone the gelatin decomposition treatment was set as a film C.

Resistance Reducing Treatment

The film C was calendared at a pressure of 30 kN using a calendering device including a metal roller. In this case, two polyethylene terephthalate films having a rough surface shape of line roughness Ra=0.2 μm and Sm=1.9 (measured (JIS-B-0601-1994) using a shape analysis laser microscope VK-X110 manufactured by Keyence Corporation) were transported such that the rough surfaces thereof faced a front surface and a back surface of the film C, and the rough surface shape was formed by transfer on the front surface and the back surface of the film C. After the calendering treatment, the film C was heated by being caused to pass through a superheated steam bath at a temperature of 150° C. for 120 seconds. The heated film was set as a touch sensor film according to Example 1, In the touch sensor film according to Example 1, a plurality of first detection electrodes, a plurality of first lead wires, and a plurality of first external connection terminals were formed on a first surface of the insulating substrate, and a plurality of second detection electrodes, a plurality of second lead wires, and a plurality of second external connection terminals were formed on a second surface of the insulating substrate.

In this case, the line width of the lead wire was 5 μm, the line width of a thin line portion (the first tine metal wire 1001 portion of FIG. 10) in the external connection terminal was 2 μm, and the interval between the thin line portions in the 1001 portion was a square of 20 μm. In addition, in the external shape of the external connection terminal, the width W was 150 μm and the length L was 1500 μm.

Example 2

A touch sensor according to Example 2 was manufactured using the same method as that of Example 1, except that a photomask was changed such that the interval between the line widths of the first fine metal wires 1001 was 40 μm.

Example 3

A touch sensor according to Example 3 was manufactured using the same method as that of Example 1, except that a photomask was changed such that the interval between the line widths of the first tine metal wires 1001 was 74 μm.

Example 4

A touch sensor according to Example 4 was manufactured using the same method as that of Example 1, except that a photomask was changed such that the shape of the external connection terminal was a shape shown in FIG. 11, the line width of the first fine metal wire 1101 was 2 μm, the distance between folding points of the first fine metal wires 1101 was 20 μm, the distance between the first fine metal wires most adjacent to each other was 5 μm, and the angle between the folding points was 90°. In the external shape of the external connection terminal, the width was 150 μm and the length was 1500 μm.

Example 5

A touch sensor according to Example 5 was manufactured using the same method as that of Example 4, except that a photomask was changed such that the distance between folding points of the first fine metal wires 1101 was 40 μm.

Example 6

A touch sensor according to Example 6 was manufactured using the same method as that of Example 4, except that a photomask was changed such that the distance between folding points of the first fine metal wires 1101 was 74 μm.

Example 7

A touch sensor according to Example 7 was manufactured using the same method as that of Example 1, except that a photomask was changed such that the shape of the external connection terminal was a shape shown in FIG. 12, the line width of the first fine metal wire 1201 was 2 μm, and the interval between the first fine metal wires 1201 was 10 μm. In the external shape of the external connection terminal, the width was 150 μm and the length was 1500 μm.

Example 8

A touch sensor according to Example 8 was manufactured using the same method as that of Example 7, except that a photomask was changed such that the interval between the first fine metal wires 1201 was 21.4 μm.

Example 9

A touch sensor according to Example 9 was manufactured using the same method as that of Example 7, except that a photomask was changed such that the interval between the first fine metal wires 1201 was 37.5 μm.

Example 10

A touch sensor according to Example 10 was manufactured using the same method as that of Example 1, except that a photomask was changed such that the shape of the external connection terminal was a shape shown in FIG. 4, the line width of the first fine metal wire 401 was 2 μm, the interval between the first fine metal wires 401 was a square shape of 23.6 μm. and the line width of the second fine metal wire 402 was 5 μm. In the external shape of the external connection terminal, the width was 150 μm and the length was 1500 μm.

Example 11

A touch sensor according to Example 11 was manufactured using the same method as that of Example 10, except that a photomask was changed such that the interval between the first fine metal wires 401 was 76 μm.

Example 12

A touch sensor according to Example 12 was manufactured using the same method as that of Example 1, except that a photomask was changed such that the shape of the external connection terminal was a shape shown in FIG. 5, the line width of the first fine metal wire 501 was 2 μm, the interval between the first fine metal wires 401 was 25.6 μm, the line width of the second fine metal wire 502 was 7.1 μm, the distance between fielding points was 50 μm, and the angle between the folding points was 90°. In the external shape of the external connection terminal, the width was 150 μm and the length was 1500 μm.

Example 13

A touch sensor according to Example 13 was manufactured using the same method as that of Example 12, except that a photomask was changed such that the interval between the first fine metal wires 501 was 76 μm.

Example 14

A touch sensor according to Example 14 was manufactured using the same method as that of Example 1, except that a photomask was changed such that the shape of the external connection terminal was a shape shown in FIG. 6, the line width of the first fine metal wire 601 was 2 μm, the interval between the first fine metal wires 601 was 9.7 μm, and the line width of the second fine metal wire 602 was 5 μm. In the external shape of the external connection terminal, the width was 150 μm and the length was 1500 μm.

Example 15

A touch sensor according to Example 15 was manufactured using the same method as that of Example 14, except that a photomask was changed such that the interval between the first fine metal wires 601 was 34.9 μm.

Example 16

A touch sensor according to Example 16 was manufactured using the same method as that of Example 1, except that a photomask was changed such that the shape of the external connection terminal was a shape shown in FIG. 7, the line width of the first fine metal wire 701 was 2 μm, the distance between folding points of the first fine metal wires 701 was 23.6 μm, the distance between the first fine metal wires most adjacent to each other was 5 μm, the angle between the folding points was 90°, and the line width of the second fine metal wire 702 was 5 μm. In the external shape of the external connection terminal, the width was 150 μm and the length was 1500 μm.

Example 17

A touch sensor according to Example 17 was manufactured using the same method as that of Example 16, except that a photomask was changed such that the interval between the first fine metal wires 701 was 76 μm.

Example 18

A touch sensor according to Example 18 was manufactured using the same method as that of Example 1, except that a photomask was changed such that the shape of the external connection terminal was a shape shown in FIG. 8, the line width of the first fine metal wire 801 was 2 μm, the interval between the first fine metal wires 801 was 16.2 μm, and the line width of the second fine metal wire 802 was 5

μm. In the external shape of the external connection terminal, the width was 150 μm and the length was 1500 μm.

Example 19

A touch sensor according to Example 19 was manufactured using the same method as that of Example 18, except that a photomask was changed such that the interval between the first fine metal wires 801 was 83.3 μm.

Example 20

A touch sensor according to Example 20 was manufactured using the same method as that of Example 1, except that a photomask was changed such that the shape of the external connection terminal was a shape shown in FIG. 9, the line width of the first fine metal wire 901 was 2 μm, the interval between the first fine metal wires 901 was 12.2 μm, the line width of the second fine metal wire 902 was 7.1 μm, the distance between folding points was 50 μm, and the angle between the folding points was 90°. In the external shape of the external connection terminal, the width was 150 μm and the length was 1500 μm.

Example 21

A touch sensor according to Example 21 was manufactured using the same method as that of Example 20, except that a photomask was changed such that the interval between the first fine metal wires 901 was 83.3 μm.

Example 22

A touch sensor according to Example 22 was manufactured using the same method as that of Example 18, except that a photomask was changed such that the interval between the first fine metal wires 801 was 11.4 μm and the line width of the second fine metal wire 802 was 10 μm.

Example 23

A touch sensor according to Example 23 was manufactured using the same method as that of Example 22, except that a photomask was changed such that the interval between the first fine metal wires 801 was 81.3 μm.

Example 24

Figure 15:
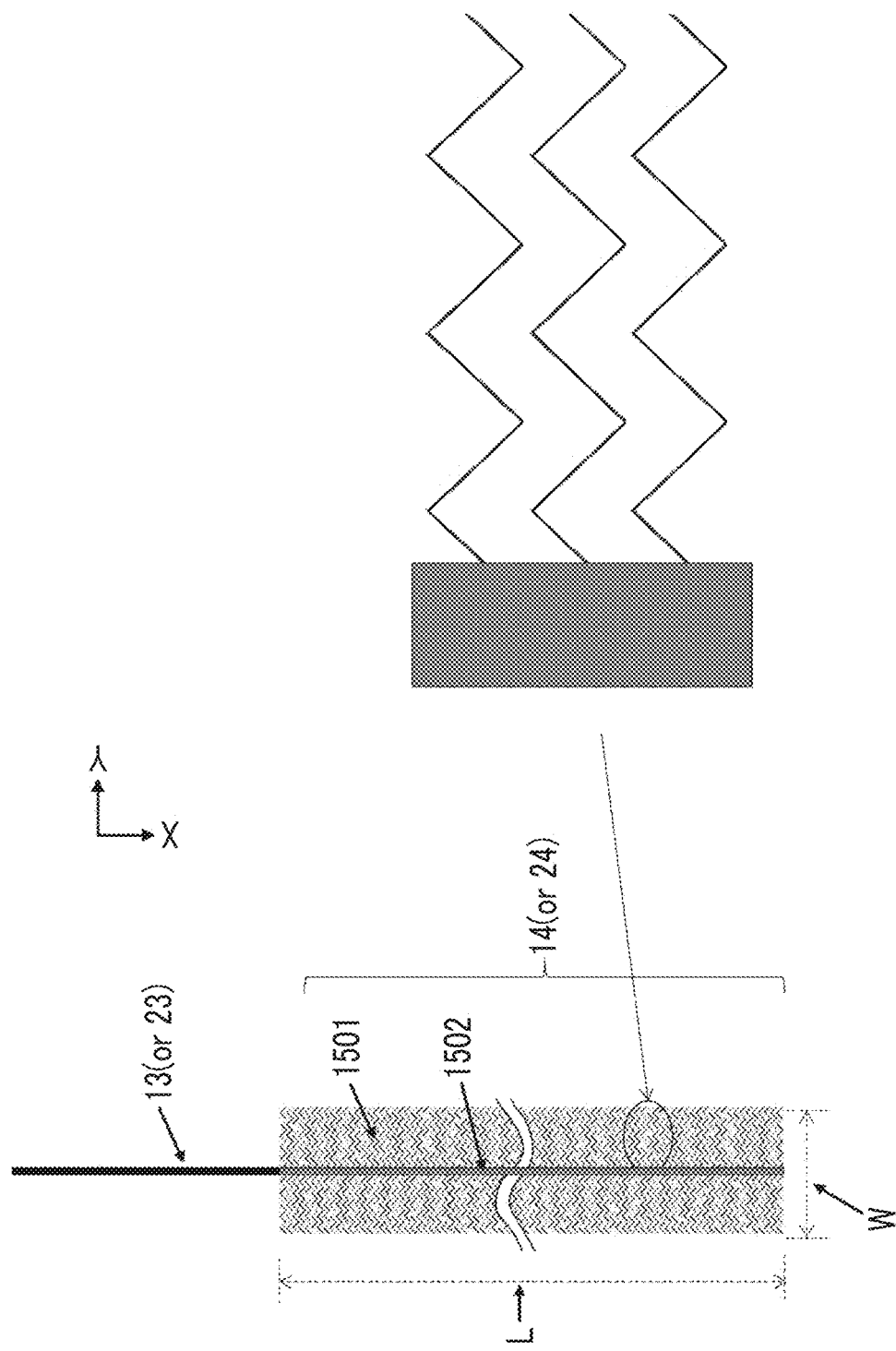
FIG. 15 is an enlarged plan view showing an external connection terminal of a touch sensor film according to Example 24.

A touch sensor according to Example 24 was manufactured using the same method as that of Example 1, except that a photomask was changed such that the shape of the external connection terminal was a shape shown in FIG. 15, the line width of a first fine metal wire 1501 was 2 μm, the distance between folding points of the first fine metal wires 1501 was 23.6 μm, the distance between the first fine metal wires adjacent to each other was 16.9 μm, the angle between the folding points was 90°, and the line width of a second fine metal wire 1502 was 5 μm. In the external shape of the external connection terminal, the width was 150 μm and the length was 1500 μm.

Example 25

A touch sensor according to Example 25 was manufactured using the same method as that of Example 24, except that a photomask was changed such that the interval between the first fine metal wires 1501 adjacent to each other was 54.4 μm.

Example 26

A touch sensor according to Example 26 was manufactured using the same method as that of Example 24, except that a photomask was changed such that the distance between folding points of the first fine metal wires 1501 was 7.9 μm.

Example 27

A touch sensor according to Example 27 was manufactured using the same method as that of Example 1, except that a photomask was changed such that a first fine metal wire 1601-1 where the shape of the external connection terminal was a shape shown in FIG. 16, the line width of a first fine metal wire 1601 was 2 μm, the distance between folding points was 39.8 μm, and an angle θ1 between the folding points was 120° and a first fine metal wire 1601-2. where the line width was 2 μm, the distance between folding points was 22.5 μm, and an angle θ2 between the folding points was 62° were adjacent to each other, the average interval between the first fine metal wires adjacent to each other was 19.9 μm, and the line width of a second fine metal wire 1602 was 5 μm. In the external shape of the external connection terminal, the width was 150 μm and the length was 1500 μm.

Example 28

A touch sensor according to Example 28 was manufactured using the same method as that of Example 27, except that a photomask was changed such that the interval between the first fine metal wires 1601 adjacent to each other was 60.0 μm.

Example 29

A touch sensor according to Example 29 was manufactured using the same method as that of Example 27, except that a photomask was changed such that the distance between folding points of the first fine metal wires 1601-1 was 13.3 μm and the distance between folding points of the first fine metal wires 1601-2 was 7.5 μm.

Comparative Example 1

Figure 13:
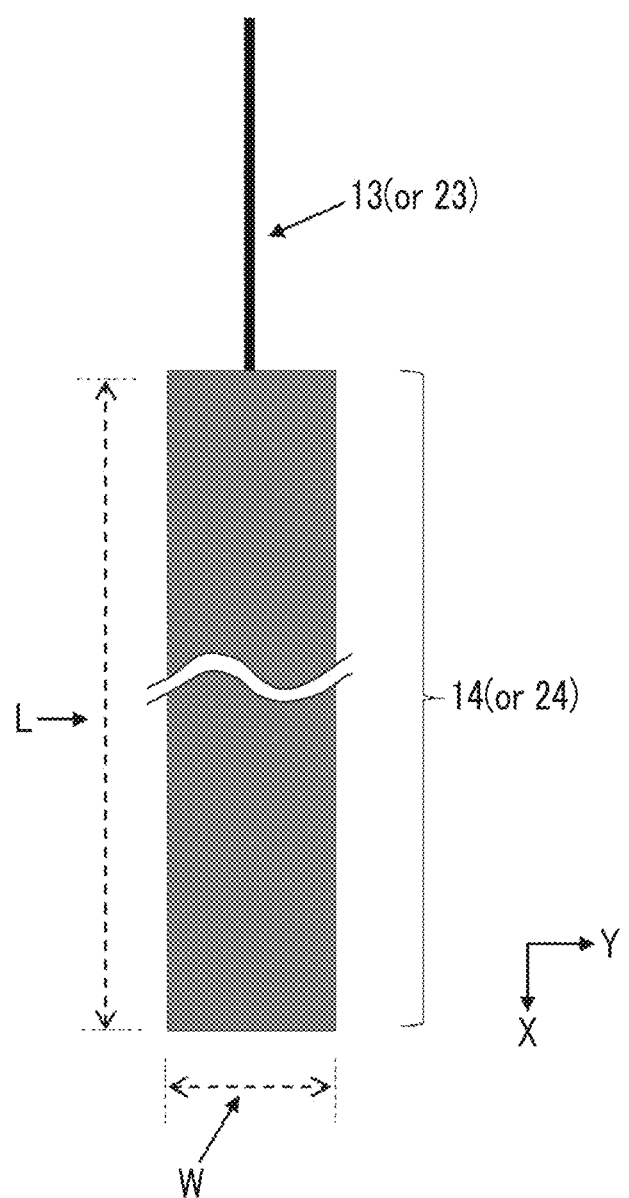
FIG. 13 is an enlarged plan view showing a general example of the external connection terminal.

A touch sensor according to Comparative Example 1 was manufactured using the same method as that of Example 1, except that a photomask was changed such that the shape of the external connection terminal was a solid shape shown in FIG. 13 and the width was 150 μm and the length was 1500 μm in the external shape.

Comparative Example 2

A touch sensor according to Comparative Example 2 was manufactured using the same method as that of Comparative Example 1, except that a photomask was changed such that the width was 10 μm and the length was 1500 μm in the external shape.

Comparative Example 3

A touch sensor according to Comparative Example 3 was manufactured using the same method as that of Comparative Example 1, except that a photomask was changed such that the width of the external shape was 10 μm.

Comparative Example 4

A touch sensor according to Comparative Example 4 was manufactured using the same method as that of Comparative Example 1, except that a photomask was changed such that the width of the external shape was 20 μm.

Comparative Example 5

A touch sensor according to Comparative Example 5 was manufactured using the same method as that of Comparative Example 1, except that a photomask was changed such that the width of the external shape was 27.5 μm.

Comparative Example 6

A touch sensor according to Comparative Example 6 was manufactured using the same method as that of Comparative Example 1, except that a photomask was changed such that the width of the external shape was 30 μm.

Comparative Example 7

A touch sensor according to Comparative Example 7 was manufactured using the same method as that of Comparative Example 1, except that a photomask was changed such that the width of the external shape was 45 μm.

Comparative Example 8

A touch sensor according to Comparative Example 8 was manufactured using the same method as that of Comparative Example 1, except that a photomask was changed such that the width of the external shape was 50 μm.

Comparative Example 9

A touch sensor according to Comparative Example 9 was manufactured using the same method as that of Comparative Example 1, except that a photomask was changed such that the width of the external shape was 100 μm.

Comparative Example 10

Figure 14:
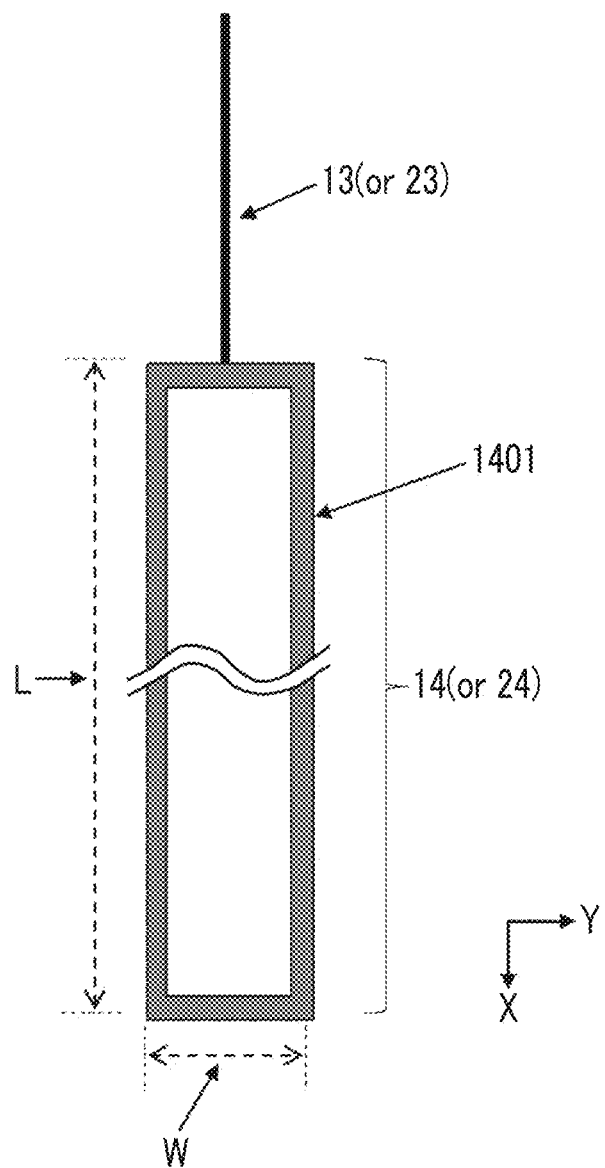
FIG. 14 is an enlarged plan view showing a general example of the external connection terminal.

A touch sensor according to Comparative Example 10 was manufactured using the same method as that of Example 1, except that a photomask was changed such that the shape of the external connection terminal was a shape shown in FIG. 14, the width was 150 μm and the length was 1500 μm in the external shape, and the line width of an external outer peripheral wire 1401 was 10 μm.

Comparative Example 11

A touch sensor according to Comparative Example 11 was manufactured using the same method as that of Example 1, except that a photomask was changed such that the interval between the line widths of the first fine metal wires 1001 was 18 μm.

Comparative Example 12

A touch sensor according to Comparative Example 12 was manufactured using the same method as that of Example 10, except that a photomask was changed such that the interval between the first fine metal wires 401 was 20 μm.

For the touch sensors according to Examples 1 to 23 and Comparative Examples 1 to 12. obtained as described above, the following conduction evaluation, FPC connection reliability evaluation, and rub resistance evaluation were performed.

Conduction Evaluation

200 touch sensor films were laminated and were left to stand for 1 day in this state. Next, the touch sensor films were taken out one by one, a resistance value between an end part of the first detection electrode and the first external connection terminal and a resistance value between an end part of the second detection electrode and the second external connection terminal were measured. In this case, a touch sensor including one portion where the resistance value was not able to be measured (was overloaded) was determined as a touch sensor having a conduction failure, and a ratio of the number of the touch sensors having a conduction failure to all of the 200 touch sensors was calculated as a failure incidence ratio. In this case, in a case where the failure incidence ratio was 0.5% or less, it was determined that a sufficient manufacturing efficiency was obtained.

FPC Connection Reliability Evaluation

A FPC was bonded to the first external connection terminal of the touch sensor film through an anisotropic conductive film (ACF) CP920CM-25AC (manufactured by Dexerials Corporation) by performing temporary pressure bonding at 100° C. for 3 seconds and main pressure bonding at 130° C. and 2.5 MPa for 10 seconds. After the bonding, the FPC was left to stand at 60° C. and 90 RH % for 10 days, and a resistance value between an external output terminal of the FPC side and a connecting part of the first external connection terminal and the lead wire was measured. This test was performed for 1000 connection terminals, a portion where the resistance value was not able to be measured (was overloaded) was determined as a connecting part having a conduction failure, and a ratio of the number of connecting parts having a conduction failure to all of the 1000 connecting parts was calculated as a conduction NG ratio. In this case, in a case where the conduction NG ratio was 0.1% or less, it was determined that a sufficient manufacturing efficiency was obtained.

Rub Resistance Evaluation

The first external connection terminal of the touch sensor film was rubbed once with BEMCOT M-1 (manufactured by Asahi Kasei Corporation, clean wiper) at a surface pressure of 0.05 MPa and a linear velocity of 10 cm/sec, and Next, a resistance value between a connecting part of the first external connection terminal and the lead wire and an end part of the first external connection terminal opposite to the connecting part with the lead wire was measured. This test was performed for 1000 connection terminals, a portion where the resistance value was not able to be measured (was overloaded) was determined as a connecting part having a conduction failure, and a ratio of the number of connecting parts having a conduction failure to all of the 1000 connecting parts was calculated as a conduction NG ratio. In this case, in a case where the conduction NG ratio was 0.1% or less, it was determined that a sufficient manufacturing efficiency was obtained.

Table 1 below shows the results of the conduction evaluation for Examples 1 to 29 and Comparative Examples 1 to 12.

TABLE 1

| | Lead Wire Line Width [μm] | External Shape of External Connection Terminal Width [μm] | External Shape of External Connection Terminal Length [μm] | External Shape of External Connection Terminal Reference Diagram | Line Width of Thickest Line Pattern (Second Metal Wire) in External Connection Terminal [μm] | Line Width of Fine Line Pattern (First Metal Wire) [μm] |
|---|---|---|---|---|---|---|
| Comparative Example 1 | 5 | 150 | 1.5 | FIG. 13 | 150 | — |
| Comparative Example 2 | 5 | 5 | 1.5 | FIG. 13 | 5 | — |
| Comparative Example 3 | 5 | 10 | 1.5 | FIG. 13 | 10 | — |
| Comparative Example 4 | 5 | 20 | 1.5 | FIG. 13 | 20 | — |
| Comparative Example 5 | 5 | 27.5 | 1.5 | FIG. 13 | 27.5 | — |
| Comparative Example 6 | 5 | 30 | 1.5 | FIG. 13 | 30 | — |
| Comparative Example 7 | 5 | 45 | 1.5 | FIG. 13 | 45 | — |
| Comparative Example 8 | 5 | 50 | 1.5 | FIG. 13 | 50 | — |
| Comparative Example 9 | 5 | 100 | 1.5 | FIG. 13 | 100 | — |
| Comparative Example 10 | 5 | 150 | 1.5 | FIG. 14 | 10 | — |
| Comparative Example 11 | 5 | 150 | 1.5 | FIG. 10 | — | 2 |
| Example 1 | 5 | 150 | 1.5 | FIG. 10 | — | 2 |
| Example 2 | 5 | 150 | 1.5 | FIG. 10 | — | 2 |
| Example 3 | 5 | 150 | 1.5 | FIG. 10 | — | 2 |
| Example 4 | 5 | 150 | 1.5 | FIG. 11 | — | 2 |
| Example 5 | 5 | 150 | 1.5 | FIG. 11 | — | 2 |
| Example 6 | 5 | 150 | 1.5 | FIG. 11 | — | 2 |
| Example 7 | 5 | 150 | 1.5 | FIG. 12 | — | 2 |
| Example 8 | 5 | 150 | 1.5 | FIG. 12 | — | 2 |
| Example 9 | 5 | 150 | 1.5 | FIG. 12 | — | 2 |
| Comparative Example 12 | 5 | 150 | 1.5 | FIG. 4 | 5 | 2 |
| Example 10 | 5 | 150 | 1.5 | FIG. 4 | 5 | 2 |
| Example 11 | 5 | 150 | 1.5 | FIG. 4 | 5 | 2 |
| Example 12 | 5 | 150 | 1.5 | FIG. 5 | 7.1 | 2 |
| Example 13 | 5 | 150 | 1.5 | FIG. 5 | 7.1 | 2 |
| Example 14 | 5 | 150 | 1.5 | FIG. 6 | 5 | 2 |
| Example 15 | 5 | 150 | 1.5 | FIG. 6 | 5 | 2 |
| Example 16 | 5 | 150 | 1.5 | FIG. 7 | 5 | 2 |
| Example 17 | 3 | 150 | 1.5 | FIG. 7 | 5 | 2 |
| Example 18 | 5 | 150 | 1.5 | FIG. 8 | 5 | 2 |
| Example 19 | 5 | 150 | 1.5 | FIG. 8 | 5 | 2 |
| Example 20 | 5 | 150 | 1.5 | FIG. 9 | 7.1 | 2 |
| Example 21 | 5 | 150 | 1.5 | FIG. 9 | 7.1 | 2 |
| Example 22 | 5 | 150 | 1.5 | FIG. 8 | 10 | 7 |
| Example 23 | 5 | 150 | 1.5 | FIG. 8 | 10 | 2 |
| Example 24 | 5 | 150 | 1.5 | FIG. 15 | 5 | 2 |
| Example 25 | 5 | 150 | 1.5 | FIG. 15 | 5 | 2 |
| Example 26 | 5 | 150 | 1.5 | FIG. 15 | 5 | 2 |
| Example 27 | 5 | 150 | 1.5 | FIG. 16 | 5 | 2 |
| Example 28 | 5 | 150 | 1.5 | FIG. 16 | 5 | 2 |
| Example 29 | 5 | 150 | 1.5 | FIG. 16 | 5 | 2 |

| | Interval between First Metal Wires or Distance between Folding Points [μm] | Pattern Area Ratio per Unit Length (External Terminal/Lead Wire) | Conduction Failure Incidence Ratio | FPC Connection Reliability Conduction NG Ratio | Rub Resistance Disconnection Incidence Ratio |
|---|---|---|---|---|---|
| Comparative Example 1 | — | 30 | 7.5% | 0.0% | 0.0% |
| Comparative Example 2 | — | 1 | 0.1% | 86.2% | 0.1% |

TABLE 1-continued

|  |  |  |  |  |  |
|---|---|---|---|---|---|
| Comparative Example 3 | — | 2 | 0.2% | 69.9% | 0.0% |
| Comparative Example 4 | — | 4 | 0.4% | 35.0% | 0.0% |
| Comparative Example 5 | — | 5.5 | 0.5% | 17.7% | 0.0% |
| Comparative Example 6 | — | 6 | 0.6% | 13.8% | 0.0% |
| Comparative Example 7 | — | 9 | 1.5% | 2.7% | 0.0% |
| Comparative Example 8 | — | 10 | 1.8% | 1.5% | 0.0% |
| Comparative Example 9 | — | 20 | 4.6% | 0.0% | 0.0% |
| Comparative Example 10 | — | 4 | 0.4% | 0.5% | 0.0% |
| Comparative Example 11 | 18 | 6.1 | 0.7% | 0.0% | 10.8% |
| Example 1 | 20 | 5.5 | 0.5% | 0.0% | 10.9% |
| Example 2 | 40 | 2.8 | 0.3% | 0.0% | 11.8% |
| Example 3 | 74 | 1.5 | 0.1% | 0.1% | 13.0% |
| Example 4 | 20 | 5.5 | 0.1% | 0.0% | 12.8% |
| Example 5 | 40 | 2.8 | 0.1% | 0.0% | 13.7% |
| Example 6 | 74 | 1.5 | 0.0% | 0.1% | 15.1% |
| Example 7 | 10 | 5.5 | 0.1% | 0.0% | 12.8% |
| Example 8 | 21.4 | 2.6 | 0.1% | 0.0% | 13.7% |
| Example 9 | 37.5 | 1.5 | 0.0% | 0.0% | 15.1% |
| Comparative Example 12 | 20 | 6.6 | 0.8% | 0.0% | 0.0% |
| Example 10 | 23.6 | 5.5 | 0.5% | 0.1% | 0.0% |
| Example 11 | 76 | 2.45 | 0.2% | 0.1% | 0.0% |
| Example 12 | 25.6 | 5.5 | 0.5% | 0.1% | 0.0% |
| Example 13 | 76 | 2.8 | 0.3% | 0.1% | 0.0% |
| Example 14 | 9.7 | 5.5 | 0.5% | 0.0% | 0.0% |
| Example 15 | 34.9 | 1.5 | 0.1% | 0.0% | 0.0% |
| Example 16 | 23.6 | 5.5 | 0.1% | 0.0% | 0.0% |
| Example 17 | 76 | 2.5 | 0.1% | 0.1% | 0.0% |
| Example 18 | 16.2 | 5.5 | 0.1% | 0.0% | 0.0% |
| Example 19 | 83.3 | 1.6 | 0.0% | 0.1% | 0.0% |
| Example 20 | 12.2 | 5.5 | 0.1% | 0.0% | 0.0% |
| Example 21 | 83.3 | 1.7 | 0.0% | 0.1% | 0.0% |
| Example 22 | 11.4 | 5.5 | 0.1% | 0.0% | 0.0% |
| Example 23 | 81.3 | 1.6 | 0.0% | 0.1% | 0.0% |
| Example 24 | 16.9 | 5.5 | 0.0% | 0.0% | 0.0% |
| Example 25 | 54.4 | 2.5 | 0.1% | 0.1% | 0.0% |
| Example 26 | 16.9 | 5.5 | 0.0% | 0.0% | 0.0% |
| Example 27 | (−1)39.8 (−2)22.5 | 5.5 | 0.0% | 0.0% | 0.0% |
| Example 28 | (−1)39.8 (−2)23.3 | 2.4 | 0.1% | 0.1% | 0.0% |
| Example 29 | (−1)13.3 (−2)7.5 | 5.5 | 0.0% | 0.0% | 0.0% |

As shown in Table 1, in Examples 1 to 29, the conduction failure incidence rate and the FPC reliability NG ratio 0.5% or less and 0.1% or less, respectively, and an excellent manufacturing efficiency was obtained. The reason for this is presumed to be as follows. In Examples 1 to 29, the pattern area ratio per unit length (per 0.5 mm) was 5.5, and the external connection terminal included the pattern finer than the lead wire. As a result, in a case Where a plurality of touch sensors were laminated, the contact area between the external connection terminals of the plurality of touch sensors was suppressed, charging in the touch sensors was suppressed, a failure such as disconnection caused by spark was suppressed, and the contact probability between the external connection terminal and the conductive balls in the ACF were secured. In addition, it can be seen from a comparison between Examples 1 to 9 and Examples 10 to 29 that the rub resistance can also be secured by providing the thick line portion having a line width of 5 μm or more in the external connection terminal in a state where the conduction failure incidence ratio and the FPC reliability NG ratio are secured.

Explanation of References
1: touch sensor film
2: substrate
2A: first surface
2B: second surface
3A: first conductive layer
3B: second conductive layer
11: first detection electrode
13: first lead wire
14: first external connection terminal
15, 25: wiring part
16, 26: terminal part
21: second detection electrode
23: second lead wire
24: second external connection terminal
MP: pattern
MW: fine metal wire
Q1: first electrode region
Q2: second electrode region
L: length
W: width 401, 501, 601 701, 801, 901, 1001, 1101, 1201, 1501, 1601, 1601-1, 1601-2: first fine metal wire 402, 502, 602, 702, 802, 902, 1502, 1602: second fine metal wire 1401: external outer peripheral wire θ1, θ2: angle

What is claimed is:

1. A touch sensor pattern of a touch sensor film, the touch sensor pattern comprising:

a plurality of detection electrodes;

a plurality of lead wires that are connected to the plurality of detection electrodes;

a plurality of external connection terminals that are connected to the plurality of lead wires, wherein each of the plurality of external connection terminals includes a plurality of first fine metal wires, each of the plurality of first fine metal wires having a smaller line width than each of the plurality of lead wires, each of the plurality of external connection terminals includes a second fine metal wire having a larger line width than each of the plurality of first fine metal wires, and an area per unit length of at least a part of each of the plurality of external connection terminals in an extension direction in a plan view is 5.5 times or less an area per unit length of each of the plurality of lead wires in a plan view.

2. The touch sensor pattern according to claim 1, wherein the second fine metal wire has a line width of 5 µm or more.

3. The touch sensor pattern according to claim 1, wherein the plurality of first fine metal wires form a mesh-like pattern.

4. The touch sensor pattern according to claim 1, wherein the plurality of first fine metal wires form a linear pattern.

5. The touch sensor pattern according to claim 2, wherein a pattern consisting of the second fine metal wire and the plurality of first fine metal wires includes a pattern consisting of a non-closed figure.

\* \* \* \* \*